United States Patent [19]
Tsukada et al.

[11] Patent Number: 5,140,344
[45] Date of Patent: Aug. 18, 1992

[54] RECORDING APPARATUS

[75] Inventors: Isao Tsukada; Hayato Shinohara, both of Yokohama; Yasuhide Saito, Urawa, all of Japan

[73] Assignee: Canon Kabushiki Kaisha, Tokyo, Japan

[21] Appl. No.: 480,000

[22] Filed: Feb. 14, 1990

[30] Foreign Application Priority Data

| | | | |
|---|---|---|---|
| Feb. 14, 1989 | [JP] | Japan | 1-34573 |
| Apr. 4, 1989 | [JP] | Japan | 1-85598 |
| May 22, 1989 | [JP] | Japan | 1-126588 |
| May 30, 1989 | [JP] | Japan | 1-134655 |

[51] Int. Cl.$^5$ .............. B41J 15/24; B41J 25/304; G01D 15/24
[52] U.S. Cl. .............. 346/139 R; 346/140 R; 400/185; 400/320
[58] Field of Search .............. 346/140 R, 139 R, 134, 346/136; 400/185, 320, 322; 474/149, 159, 204, 205

[56] References Cited

U.S. PATENT DOCUMENTS

| | | | |
|---|---|---|---|
| 4,030,588 | 6/1977 | Hanagata et al. | 400/185 |
| 4,313,124 | 1/1982 | Hara | 346/140 |
| 4,459,054 | 7/1984 | Dollenmayer | 400/185 |
| 4,920,258 | 4/1990 | Saito | 400/320 |

FOREIGN PATENT DOCUMENTS 1524822 9/1978 United Kingdom .............. 474/149

*Primary Examiner*—Benjamin R. Fuller
*Assistant Examiner*—Alrick Bobb
*Attorney, Agent, or Firm*—Fitzpatrick, Cella, Harper & Scinto

[57] ABSTRACT

A recording apparatus for effecting recording on a recording medium has a recording head for effecting recording on the recording medium, a reversible motor, a force transmitting device for transmitting the drive force of the motor, a belt having both an engagement portion engageable with the force transmitting device to receive the transmission of the force in order to move the recording head, and an area in which the engagement portion is not provided, and a control unit for controlling the motor so that the motor is rotated in a reverse direction and thereafter rotated in a forward direction when the engagement portion of the belt is brought into engagement with the force transmitting device.

10 Claims, 20 Drawing Sheets

| MTPC (PATTERN) | φ1 | φ2 | φ3 | φ4 |
|---|---|---|---|---|
| 1 | 0 | 0 | 1 | 1 |
| 2 | 0 | 0 | 0 | 1 |
| 3 | 1 | 0 | 0 | 1 |
| 4 | 1 | 0 | 0 | 0 |
| 5 | 1 | 1 | 0 | 0 |
| 6 | 0 | 1 | 0 | 0 |
| 7 | 0 | 1 | 1 | 0 |
| 8 | 0 | 0 | 1 | 0 |

1-2 PHASE EXCITATION

RECORDING APPARATUS

BACKGROUND OF THE INVENTION

1. Field of the Invention

This invention relates to a recording apparatus, and more particularly to a so-called serial type recording apparatus in which recording means is movable along a recording medium (such as plain paper, worked paper or an OHP sheet) on which recording is to be effected.

The term "recording apparatus" used herein covers an electronic desk top calculator, an electronic typewriter, a facsimile apparatus, a copying apparatus and a printer. The term "recording means" covers recording means using the thermal recording system such as the thermosensitive system or the heat transfer system, recording means using the ink jet recording system such as the bubble jet syste, and recording means using the impact recording system such as the daisy wheel system or the wire dot system.

2. Related Background Art

A recording apparatus in which the reciprocal movement of a carriage and the conveyance of recording paper are accomplished by a single drive source is known. The applicant has previously invented a particularly excellent recording apparatus in which the conveyance of a recording medium and the reciprocal movement of recording means can be accomplished by the use of a reversible drive source. The applicant filed an application for said invention (U.S. application Ser. No. 395,519 filed on Aug. 18, 1989). The invention of the present application which will hereinafter be described as a further development of the aforedescribed recording apparatus. Description will now be made of the background art on which the invention of the present application has been made.

In the recording apparatus as previously described herein the driving of a carriage and the feeding of paper are accomplished by a single drive source, a belt-driving pulley 125 first starts to rotate in the direction of arrow A from the state shown in FIG. 1A of the accompanying drawings. A belt 106 then starts to be moved by the mutual friction between an untoothed portion 106A and the driving pulley 125. Thereafter, the toothed portion 106C of the timing belt 106 and the driving pulley 125 come into meshing engagement with each other. At this time, however, the leading tooth 125a of the driving pulley 125 and the tooth 106C of the timing belt 106 are not synchronized with each other. Therefore, there is the possibility that the rest of the toothed portion 106C of the belt may run on the crest of the teeth of the driving pulley 125 (FIG. 1B of the accompanying drawings).

That is, normally, the crest of the tooth of the driving pulley must come into the valley of the toothed portion of the belt, but there is the possibility that there is brought about an abnormal state in which the crest of one tooth runs on the crest of the other tooth as previously described. If the driving pulley continues to rotate in such an abnormal state, the belt will move while remaining in such an abnormal state. This state is an unstable state, in which the feeding of the belt becomes inaccurate and in addition, normal meshing engagement may be suddenly restored (the crests which run on each other may fall into the valleys).

Such a phenomenon has been confirmed by an experiment as well.

FIG. 1C of the accompanying drawings is a graph showing an example of the above-described phenomenon. It shows that with the belt tension being set to 150 gf and with the feeding speed of the belt-driving pulley being set to 130 mm/sec., when the feeding amount of the belt-driving pulley (from the meshing start point with the toothed portion of the belt) is e.g. 2 mm, the crest of the tooth of the belt-driving pulley and the crest of the toothed portion of the belt run on each other with a probability of about 15%.

The run-on state described above may last even to the printing area and may cause unsatisfactory recording attributable to the impossibility of normal carriage feeding being obtained.

SUMMARY OF THE INVENTION

It is an object of the present invention to provide a recording apparatus which can accomplish recording of high quality.

It is another object of the present invention to provide a recording apparatus in which the reciprocal movement of recording means and the conveyance of a recording medium can be accomplished by a single drive source and which is improved in the quality of recording.

It is still another object of the present invention to provide a recording apparatus in which the reciprocal movement of recording means can be accomplished stably.

It is yet still another object of the present invention to provide a belt which can prevent the crest of the tooth of a driving pulley and the crest of the toothed portion of a timing belt from running on each other to thereby realize accurate and stable feeding of a carriage and secure a high quality of printing, and a recording apparatus provided with such a belt.

It is a further object of the present invention to provide not only the carriage driving mechanism of the aforedescribed recording apparatus but also a timing belt driving mechanism in which even if the run-on of a tooth occurs during the meshing engagement of the untoothed portion to the toothed portion of a timing belt with the aforedescribed driven pulley, such run-on can be quickly eliminated to thereby enable the shift to a normal meshing state.

DESCRIPTION OF THE PREFERRED EMBODIMENTS

Some embodiments of the present invention will hereinafter be described in detail.

Recording apparatuses such as printers and facsimile apparatuses are designed such that a recording head is driven on the basis of recording information to thereby effect the recording of images on a recording medium such as paper and the paper is fed each time one line is recorded, thereby recording the next line.

Particularly serial type recording apparatuses in which a recording medium is major-scanned in the direction of print columns on lines by a recording head are designed such that the recording head is carried on a carriage reciprocally movable in the direction of print column and major scanning is effected by the movement of the carriage and carriage return and the feeding of the paper are effected each time one line is recorded.

Among the aforedescribed recording apparatuses, an electronic desk top calculator C using a disposable ink cartridge of the bubble jet type will hereinafter be described as an example.

Figure 2:
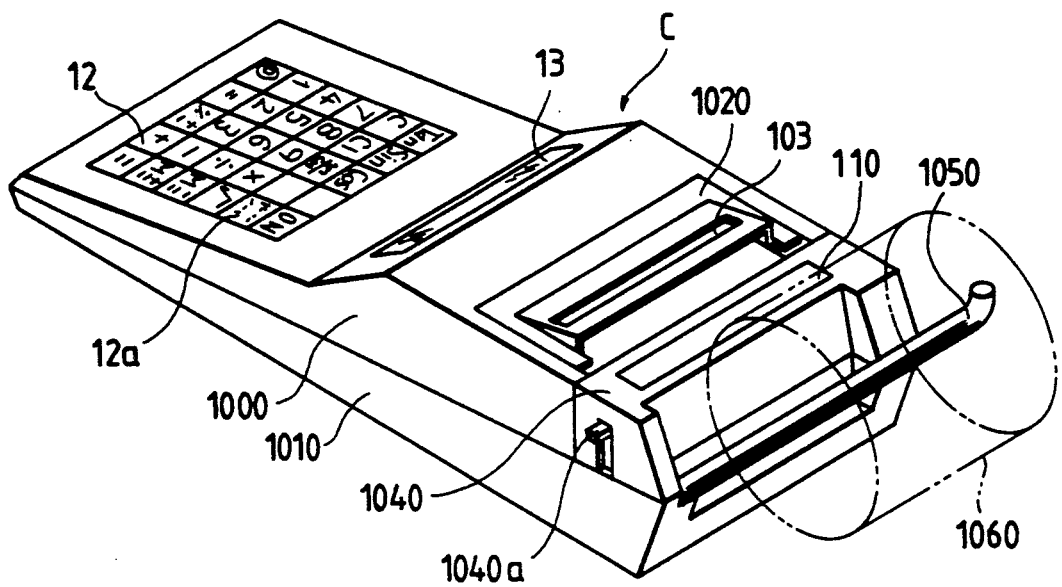
FIG. 2 is a pictorial perspective view of an electronic desk top calculator to which an embodiment of the present invention is applied.

Reference is first had to FIG. 2 to describe an electronic desk top calculator C to which an embodiment of the present invention is applied.

In FIG. 2, the reference numeral 1000 designates an upper case which cooperates with a lower case 1010 to constitute an outer case. The reference numeral 1020 denotes a printer lid removably mounted on the upper case 1000 and removable from the upper case 1000 when a recording head 108 or an ink cartridge is interchanged. The printer lid 1020 is formed with a discharge port 103 for discharging therethrough a recording sheet 111 after recording. The reference numeral 1040 designates a platen cover pivotally connected to the lower case 1010. By a lever 1040a being depressed, the platen cover is rotated clockwise with a feed roller 109 and a platen 112 to thereby open a recording sheet conveyance path. The reference numeral 110 denotes a recording sheet insertion port for introducing therethrough a rolled sheet 1060 supported by a rolled sheet holder 1050 into a recording unit. The reference numeral 12 designates a keyboard provided with various input keys 12a. The reference numeral 13 denotes a display unit for displaying input information, the result of calculation, etc.

Description will now be made of a recording system R which is contained in the electronic desk top calculator C and to which an embodiment of the present invention is applied.

Figure 3:
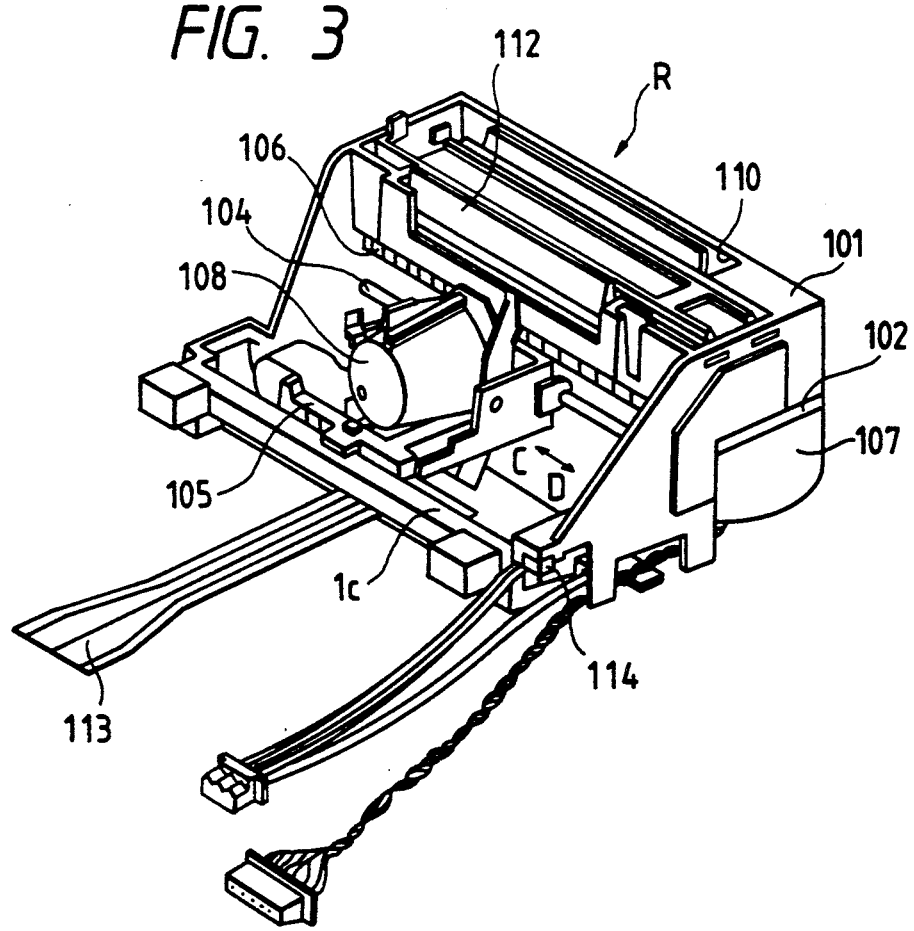
FIG. 3 is a perspective view of a recording apparatus suitable for carrying out the present invention.
Figure 4:
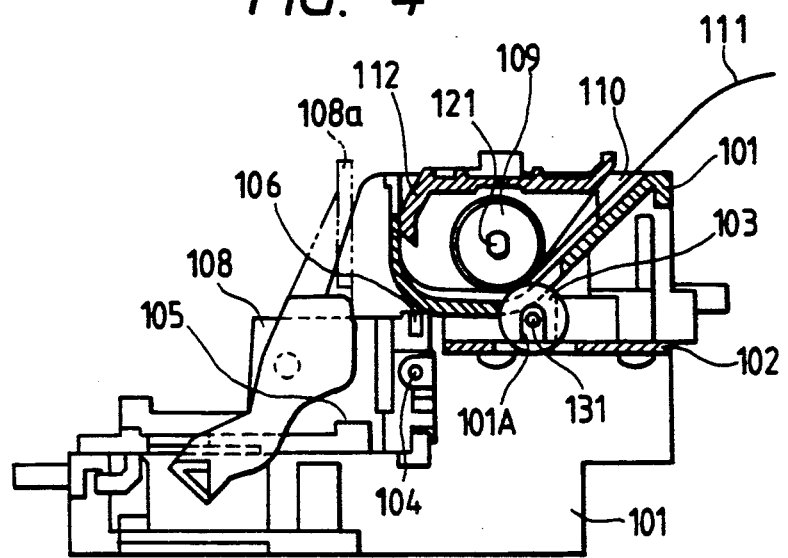
FIG. 4 is a longitudinal cross-sectional view of the recording apparatus of FIG. 3.

FIG. 3 is a perspective view showing the general construction of the recording system, and FIG. 4 is a longitudinal cross-sectional view thereof.

In FIGS. 3 and 4, the reference numeral 101 designates a frame forming the outer shell of the recording system R, and the reference numeral 102 denotes a chassis (base bed) fixed to the frame 101 and supporting thereon a stepping motor 107 and a pinch roller 103 (FIG. 4) which will be described later. The reference numeral 104 designates a guide shaft fixed to the frame 101 and reciprocably guiding a carriage 105. The reference numeral 106 denotes a timing belt connected to the carriage 105 and moving the carriage 105 along the platen 112 in response to the rotation of the stepping motor 107. The reference numeral 108 designates a recording head removably carried on the carriage 105 and discharging ink from discharge ports on the basis of image information to thereby effect recording. The reference character 108a denotes a head lever for mounting the head 108 on the carriage 105.

The reference numeral 109 (FIG. 4) designates a feed roller for feeding a recording medium (a recording sheet such as paper) 111 inserted through the insertion port 110 to a recording position. The surface of the feed roller 109 is provided with a layer of an anti-slip elastic material.

The feed roller 109 may be driven by the stepping motor 107 during paper feed to feed out the recording sheet 111 while nipping the recording sheet between itself and the pinch roller 103.

The reference numeral 112 denotes a platen for holding the recording sheet 111 at the recording position, the reference numeral 113 designates a flexible cable for supplying recording signals to the recording head 102 carried on the carriage 105, and the reference numeral 114 denotes a home position sensor for detecting the arrival of the carriage 105 at the home position outside the recording area.

Description will now be made of a driving system for the timing belt 106 and a driving system for the feed roller 109.

Figure 5:
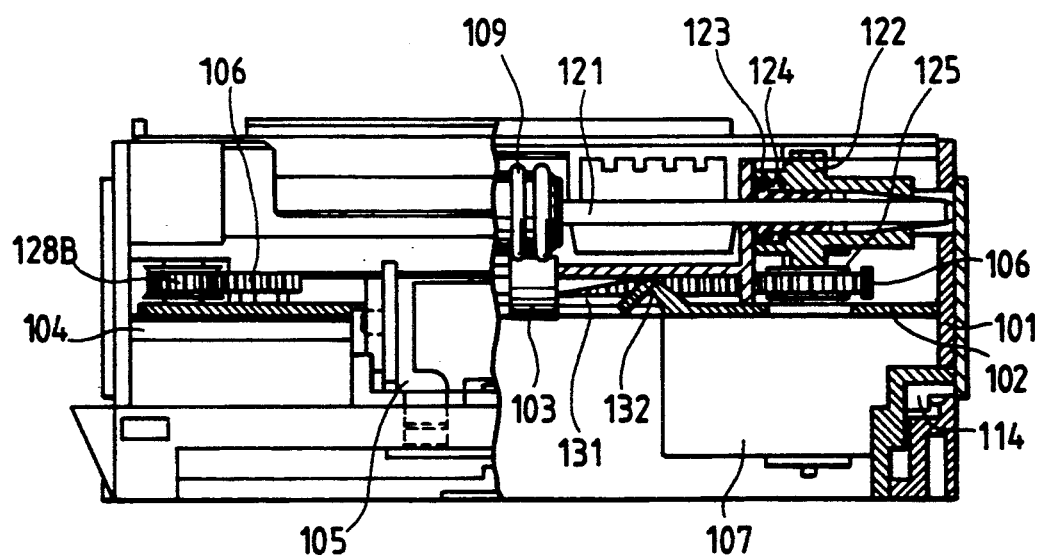
FIG. 5 is a front view, partly in cross-section, of the recording apparatus of FIG. 3.
Figure 6:
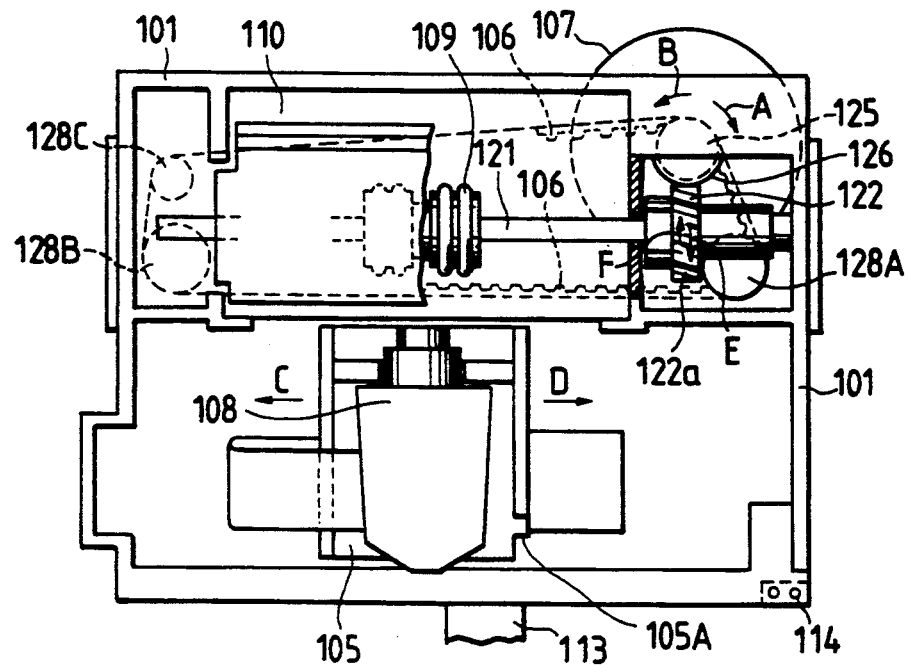
FIG. 6 is a partly broken-away plan view of the recording apparatus of FIG. 3.
Figure 7:
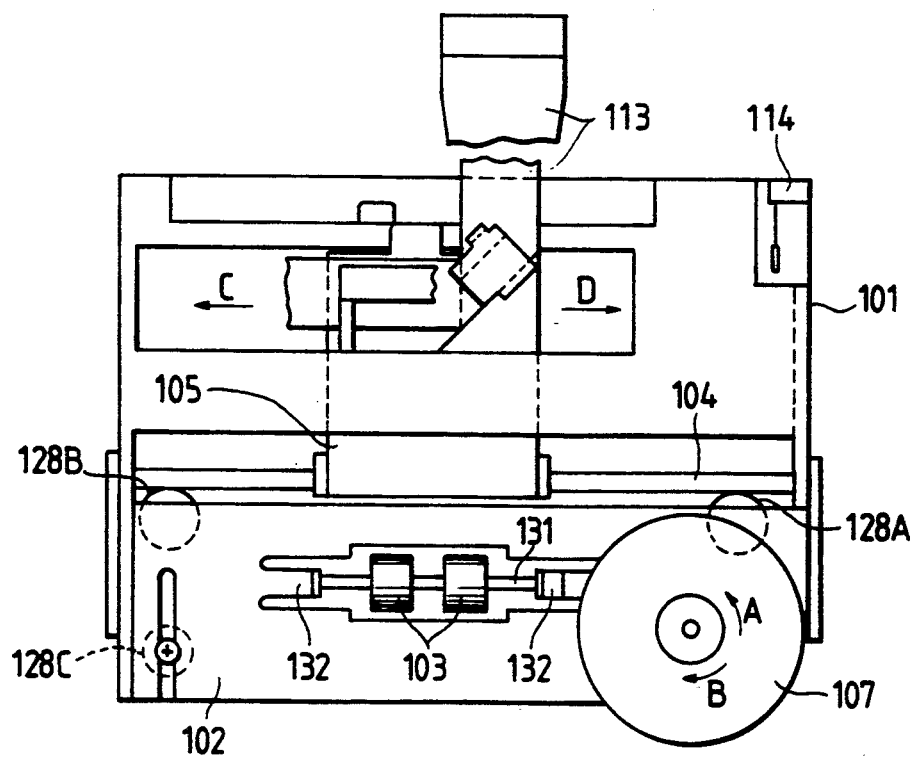
FIG. 7 is a bottom plan view of the recording apparatus of FIG. 3.

FIG. 5 is a front view, partly in cross-section, of the recording system R of FIG. 3, FIG. 6 is a plan view, partly in cross-section, of the recording system of FIG. 5, and FIG. 7 is a bottom plan view of the recording system of FIG. 5.

In FIGS. 5 and 6, the reference numeral 121 designates the shaft of the feed roller 109, and the reference numeral 122 denotes a worm wheel fitted to the shaft 121 of the feed roller and enabling this shaft to rotate only in one direction. The reference numeral 123 designates an arbor fixedly fitted to the roller shaft 121, and the reference numeral 124 denotes a spring clutch interposed between the arbor 123 and the worm wheel 122. This spring clutch 124 has one end thereof restrained in a groove 122a in the worm wheel 122 and is rotatable with the worm wheel, but the spring thereof does not engage the arbor 123 when the worm wheel 122 is rotated in the direction of arrow E in FIG. 6 by the stepping motor 107 (i.e., during recording). Accordingly, the feed roller 109 is kept unrotated with the roller shaft 121.

On the other hand, when the worm wheel 122 is rotated in the direction of arrow F (i.e., during paper feed), the spring of the clutch 124 comes into engagement with the arbor and thereby can rotate the feed roller 109 and the roller shaft 121 in that direction.

Figure 8:
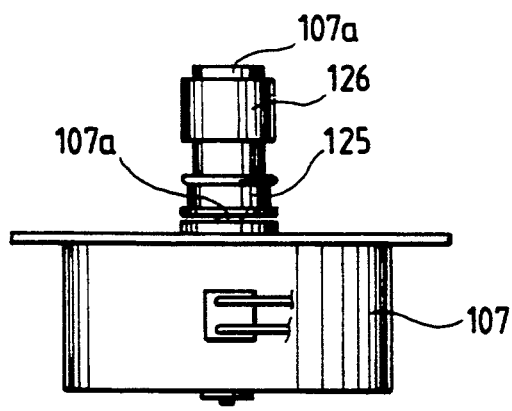
FIG. 8 is a side view of the stepping motor of the recording apparatus of FIG. 3.

Further, in FIG. 5, the reference numeral 125 designates a belt-driving pulley rotated by the stepping motor 107 and driving the timing belt 106. In FIG. 6, the reference numeral 126 denotes a worm gear rotated by the stepping motor 107 and meshing with the worm wheel 122. FIG. 8 shows the output shaft 107a of the stepping motor 107, and the belt-driving pulley 125 and the worm gear 126 are integrally formed on the same shaft and mounted on the shaft 107a of the stepping motor 107. Accordingly, the belt-driving pulley 125 and the worm gear 126 can be driven at a time by the single stepping motor 107.

The construction regarding the pinch roller 103 will now be described with reference to FIGS. 4, 5 and 6.

In these figures, the reference numeral 131 designates a pinch roller shaft formed of a springy material. The opposite end portions of the pinch roller shaft 131 are held in guide slots 101A in the frame 101, as shown in FIG. 4. Also, this pinch roller shaft 131, between its opposite end portions and the pinch roller 103, is biased toward the feed roller 109 by a projection 132 protruding from the chassis 102, as shown in FIG. 5.

The operation of the recording apparatus R having the above-described construction will now be described.

Before recording is started, as shown in FIG. 6, a corner 105A of the carriage 105 bears against the home position sensor 114 and that state is detected by the sensor 114, whereby the carriage 105 is stopped. When a moving signal for feeding the carriage 105 in the direction of column for recording is supplied to the stepping motor 107, the motor 107 starts to rotate in the direction of arrow A to thereby rotate the belt-driving pulley 125 with the worm gear 126. Here, the worm wheel 122 is rotated in the direction of arrow E by the worm gear 126. However, in this direction, the spring clutch 124 shown in FIG. 5 releases its engagement with the arbor 123 and therefore, the roller shaft 121 to which the arbor 123 is fitted is not rotated. Accordingly, the paper feeding operation by the feed roller 109 does not take place.

Thus, the carriage 105 is moved in the direction of arrow C by the rotation of the belt-driving pulley 125 in the direction of arrow A (FIG. 6) and in the meantime, an ink discharge signal is selectively supplied to the recording head 108 through the flexible cable 113 in synchronism with the column feed signal of the motor 107 and ink is discharged, whereby recording is effected on the recording sheet 111. The timing belt 106 is extended between the driving pulley 125 and idler pulleys 128A, 128B, 128C.

When recording is then terminated, the stepping motor 107 rotates in the reverse direction to return the carriage 105 toward the home position sensor 114, i.e., in the direction of arrow D. That is, the stepping motor 107 rotates in the direction of arrow B, and the rotation of the worm gear 126 and the belt-driving pulley 125 in the same direction causes the worm wheel 122 to rotate in the direction of arrow F. When the worm wheel 122 is rotated in the direction arrow F, the spring clutch 124 shown in FIG. 5 comes into engagement with the arbor 123, whereby the roller shaft 121 can be rotated in the same direction (the direction of arrow F). Accordingly, the feeding of the recording sheet 111 by the feed roller 109 is executed. That is, paper feeding can be effected during the returning operation of the carriage 105.

Also, by the utilization of the untoothed portion of the timing belt 106, paper feeding can be continuously effected without the carriage 105 being fed in the column direction. That operation will hereinafter be described.

Figure 9:
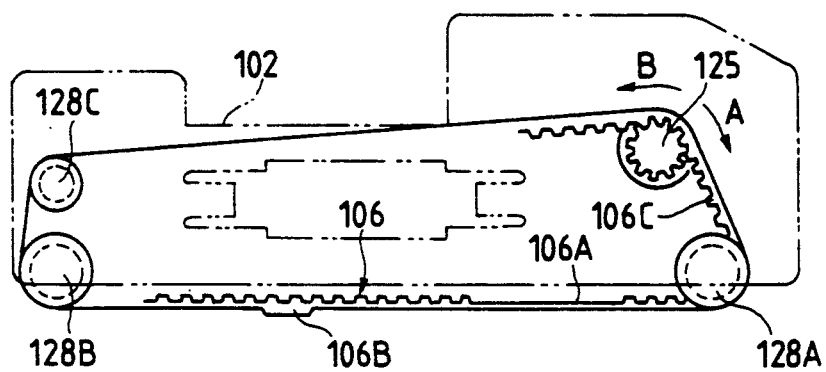
FIGS. 9 and 10 are plan views of the timing belt of the recording apparatus of FIG. 3, FIG. 9 showing the toothed portion of the timing belt as it is in meshing engagement with a driving pulley, and FIG. 10 showing the untoothed portion of the timing belt as it has come to the location of the driving pulley.
Figure 10:
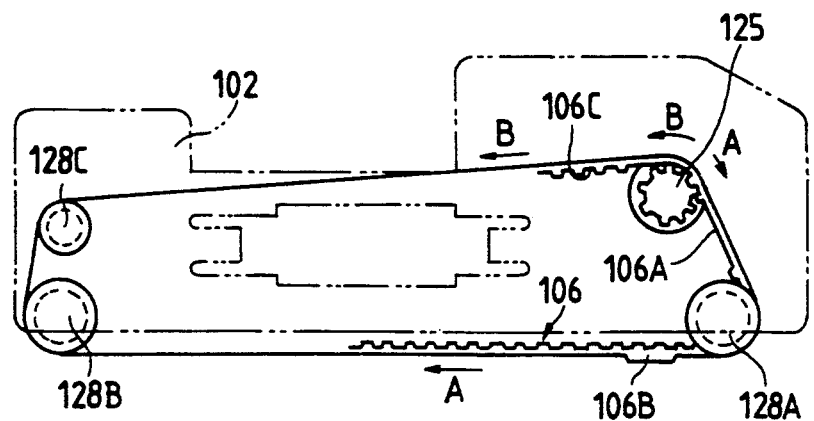
Figure 11:
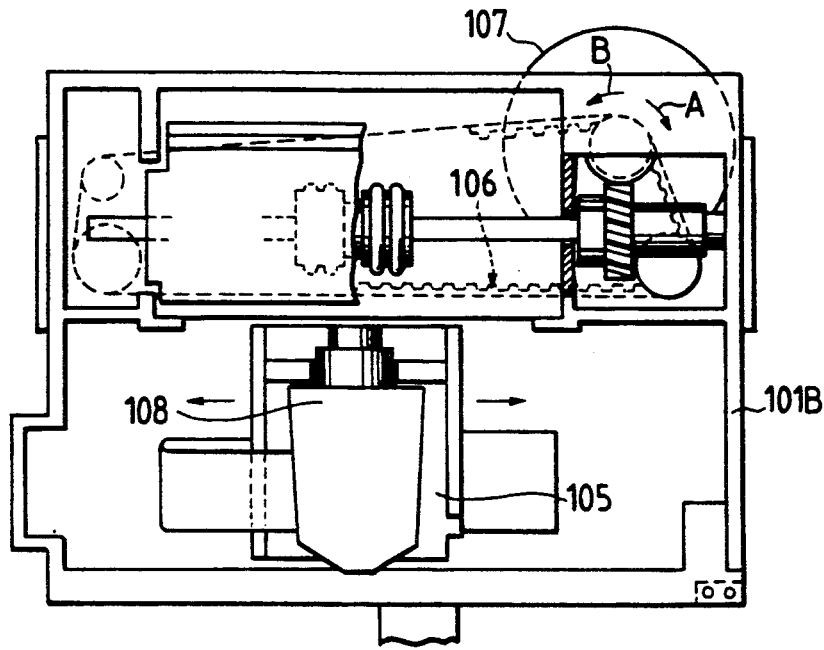
FIG. 11 is a plan view showing the position of a carriage corresponding to the state shown in FIG. 9.
Figure 12:
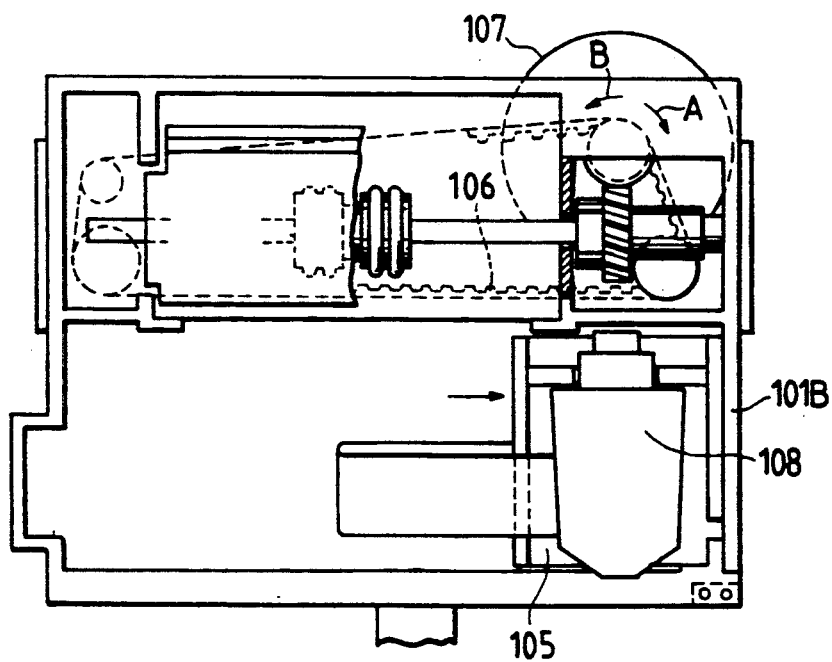
FIG. 12 is a plan view showing the position of the carriage corresponding to the state shown in FIG. 10.

FIGS. 9 and 10 show the essential portions of the belt 106, the chassis 102 and the pulleys 125, 128, and FIGS. 11 and 12 are plan views of the recording apparatus R in a state in which the position of the carriage 105 differs.

FIG. 9 shows the state of the timing belt 106 when the carriage 105 is in the position of FIG. 11, and FIG. 10 shows the state of the timing belt 106 when the carriage 105 is in the position of FIG. 12. As shown in these figures, the timing belt 106 is provided with an untoothed portion 106A and a positioning portion 106B for the carriage 105.

Now, FIGS. 9 and 11 show the course of the operation in the state of normal recording.

Figure 13:
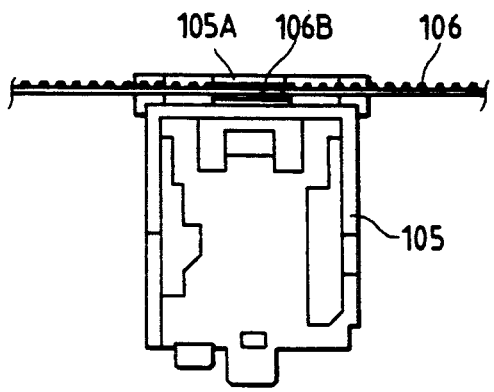
FIG. 13 is a plan view showing the belt positioning of the carriage of the recording apparatus of FIG. 3.

The carriage 105 is formed with a groove 105A (FIG. 13) for the positioning portion 106B of the timing belt 106 so that the positioning portion 106B of the timing belt 106 may come into the groove 105A.

FIGS. 10 and 12 show the continuous paper feeding operation. In these figures, the untoothed portion 106A of the timing belt 106 is positioned on the driving pulley 125. At this time, the carriage 105 bears against the right regulating wall 101B of the frame 101. The timing roller 106 is extended between the idler pulleys (follower pulleys) 128A, 128B, 128C and the driving pulley 125. So, when the driving pulley 125 is rotated in the direction of arrow B in FIG. 10, the untoothed portion 106A of the timing belt 106 and the driving pulley 125 become slidable because of the absence of the belt teeth but try to the rotate in the same direction by the mutual frictional force therebetween. However, since the carriage 105 bears against the frame wall 101B, the timing belt 106 is not moved and the belt-driving pulley 125 rotates idly.

Also, as the belt-driving pulley 125 is rotated, the worm gear 126 is also rotated, but the rotation in the direction of arrow B in FIG. 10 is the rotation in a direction to effect paper feeding as previously described. That is, paper feeding can be effected while the carriage 105 is bearing against the right wall of the frame 101 as shown in FIG. 11.

On the other hand, when the belt-driving pulley 125 is rotated in the direction of arrow A in FIG. 10, the timing belt 106 is moved in the same direction as the direction of arrow A by the frictional force because the timing belt 106 is extended as previously described. When the untoothed portion 106A is advanced and the toothed portion 106C of the timing belt 106 comes into contact with the belt-driving pulley 125, the belt 106 meshes with the pulley 125, whereafter the normal recording operation can be effected without any loss of the transmitting force.

A wear resisting property is required of the core material of the timing belt 106, but even Kevlar (registered trademark) usually used or the like can sufficiently stand practical use.

An embodiment to which the present invention is applied will hereinafter be described specifically with reference to the drawings.

Figure 14:
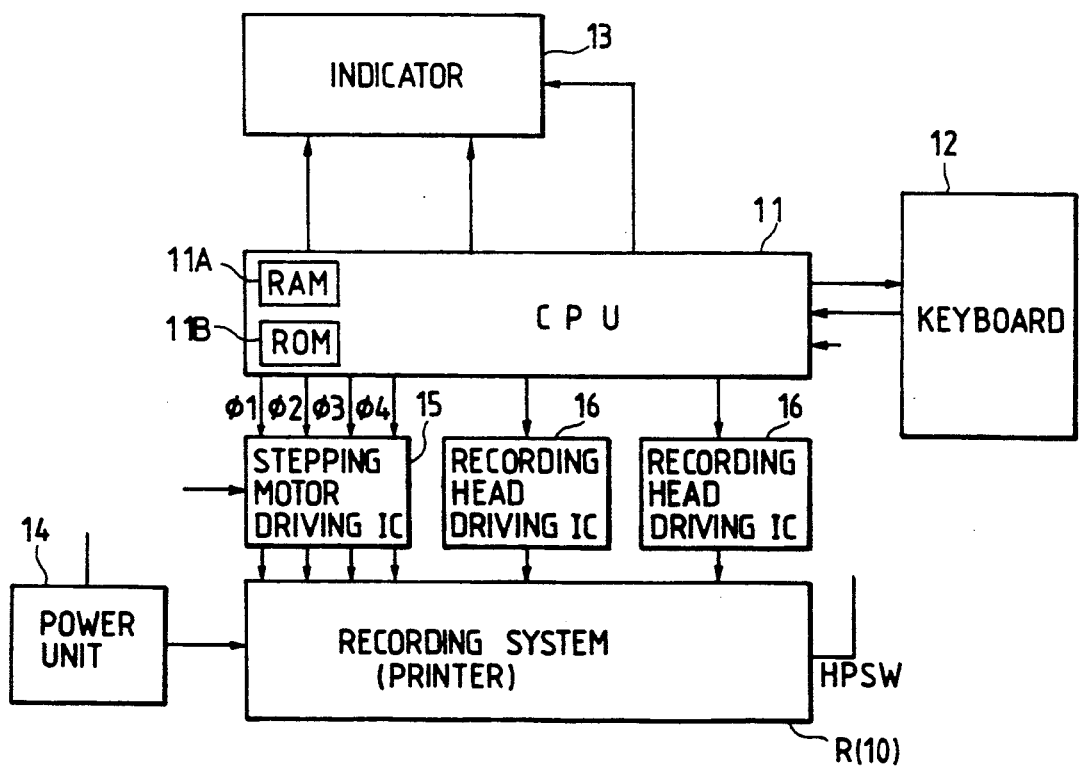
FIG. 14 is a block diagram showing the construction of an electronic instrument provided with a recording system according to an embodiment of the present invention.

FIG. 14 is a block diagram showing the construction of an electronic desk top calculator provided with a recording system R according to an embodiment (Embodiment 1) of the present invention.

In FIG. 14, the reference numeral 11 designates a CPU which carries out the calculating process in the calculator and effects the control of various portions while exchanging signals with a keyboard 12 and a recording system R (10) or an indicator 13, etc. The CPU 11 has a ROM 11B storing the process procedure, etc. therein and a RAM 11A used for the work area or the like in the processing.

The reference numeral 14 denotes a power unit the reference numeral 15 designates a stepping motor driving IC, and the reference numeral 16 denotes a recording head driving IC.

Figures 15A, 15B:
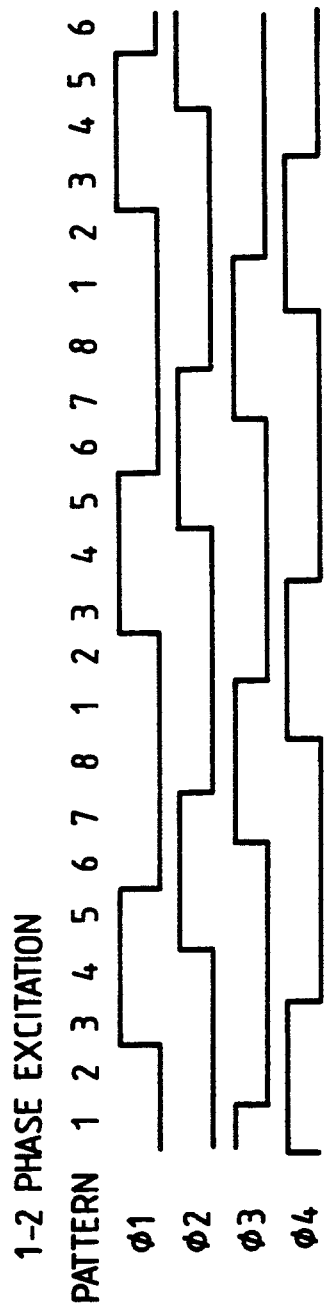
FIGS. 15A and 15B are a conceptional illustration of a table showing the correspondence between the phase pointer memory of the CPU in FIG. 14 and the phase excitation pattern and a single waveform graph showing the phase excitation pattern, respectively.

FIG. 15A shows a phase table stored in the ROM 11B in the CPU 11, and the excitation pattern in the phases $\phi1$-$\phi4$ of the stepping motor 107 of FIG. 3 is made to correspond to the content of a phase pointer memory MTPC in the CPU 11. That is, the phase table of FIG. 15A shows a 1-2 phase excitation system in the four phases $\phi1$-$\phi4$, and light patterns form one period of excitation.

Also, FIG. 15B shows the relation between the phase pointer MTPC based on the aforedescribed phase table and the excitation pulse waveforms.

Now, in FIG. 14, a signal HPSW is a signal for detecting that the carriage 105 has come to bear against the home position sensor 114 (FIG. 3) provided in the recording apparatus R (10), and determining the reference position of the carriage 105 (FIG. 3).

Figure 16:
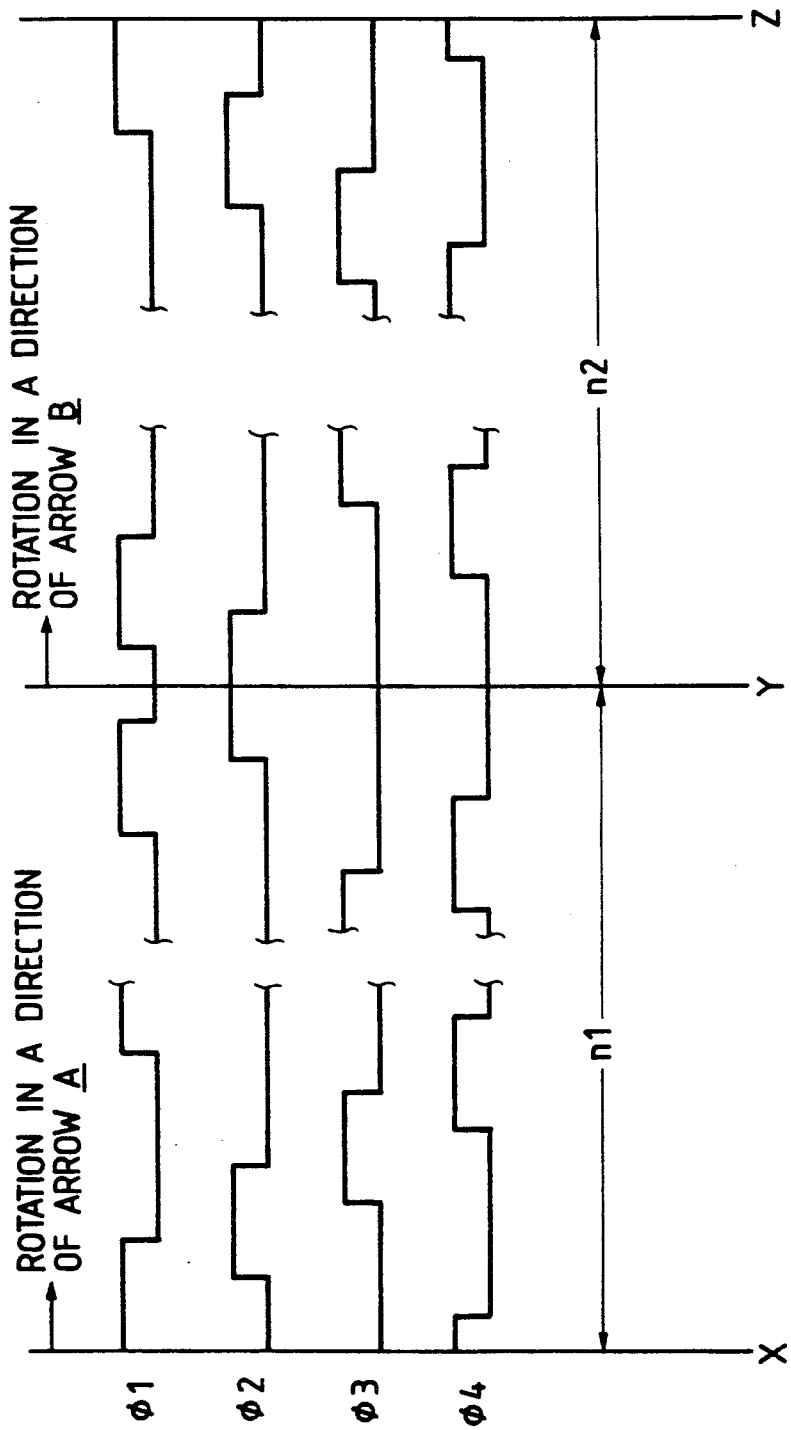
FIG. 16 is a control time chart of the stepping motor of a recording apparatus according to an embodiment of the present invention.
Figure 17:
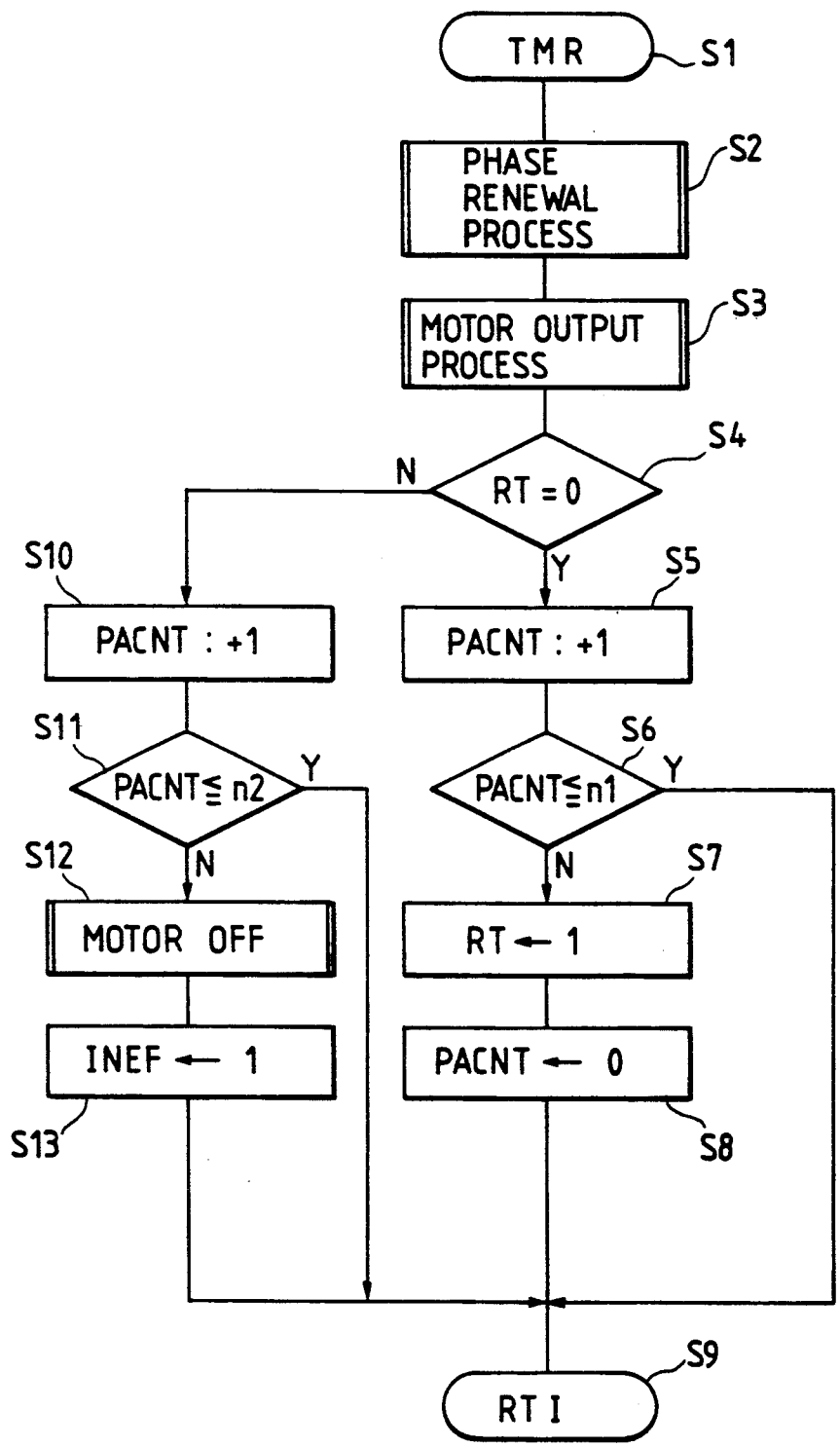
FIG. 17 is a flow chart of the timer process by the CPU for executing the motor control of FIG. 6.

Further, FIG. 16 shows a control time chart of the stepping motor (drive source) in an embodiment (Embodiment 1) of the present invention, and FIG. 17 is a flow chart of the timer process by the CPU 11 for driving the stepping motor as per the control-time chart thereof shown in FIG. 16.

The operation of the present embodiment (Embodiment 1) will now be described specifically on the basis of the above-described construction.

When from the state of FIG. 10, the belt-driving pulley 125 starts to rotate in the direction of arrow A, the belt 106 starts to be moved in the direction of arrow A by the mutual frictional force between the untoothed portion 106A of the belt and the driving pulley 125. Thereafter, the toothed portion 106C provided on the timing belt 106 comes into meshing engagement with the driving pulley 125. At this time, as previously described, the teeth of the driving pulley 125 and the toothed portion 106C of the timing belt 106 are not synchronized with each other and therefore, there is the possibility that the tops or crests of those teeth run on each other.

Figure 1A:
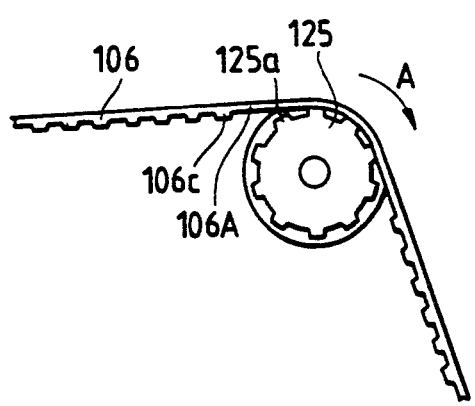
FIGS. 1A and 1B illustrate the manner in which the teeth of a timing belt and a belt-driving pulley run on each other.
Figure 1B:
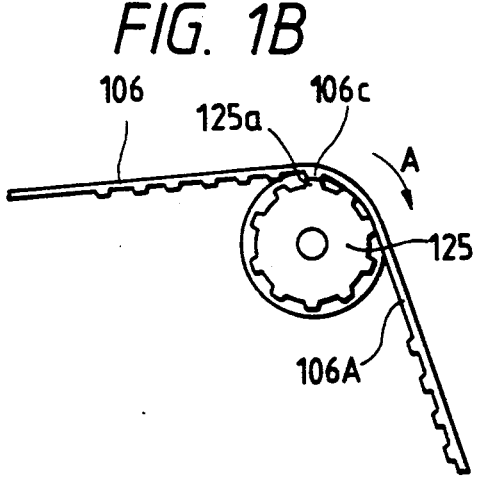

When in this state, the driving pulley 125 further continues to rotate in the direction of arrow A, the belt 106 moves while maintaining the aforedescribed run-on state. However, as is clear from the aforedescribed example of the experiment (FIG. 1), as the feeding amount by the driving pulley 125 is increased, the occurrence rate of run-on is extremely reduced. Inferring from the experimental example, at Y position in FIG. 16, the occurrence rate is 1% or less.

The stepping motor control in the above-described operation is shown between X-Y in the time chart of FIG. 16.

Subsequently, at Y position, the stepping motor 107 is reversed from the direction A to the direction B.

By this reversing operation, the balance of contact between the crest of leading tooth of the belt-driving pulley 125 and the crest of the leading tooth of the toothed portion 106C of the belt 106 which have run on each other with the probability of 1% or less is destroyed and the two slide relative to each other, and the crest of one tooth falls into the valley of the other tooth, whereby it is possible to restore the completely normal meshing state.

The reason is that during the reversal of the belt-driving pulley 125, the inertia load by the mass of the carriage 105 is created and therefore a force opposing the reversal is created in the belt 106. On the other hand, the belt-driving pulley 125 follows in the direction of arrow B at a high speed and therefore, a deviating force is created in the portion of contact wherein the crests of the two teeth ride on each other and consequently, the two come back into the normal meshing state.

The set value of n1 in FIG. 16 may basically be any value if it is greater than the sum of the width of the tooth of the belt-driving pulley 125 and the width of the tooth of the toothed portion 106C of the belt 106, but the greater n1 is, the higher becomes the probability with which the normal meshing state is restored. Also, as regards the set value of n2, because the carriage 105 comes into the printing area by the feeding of n1, the carriage need be once returned out of the printing area and n2 need be set so that there may be provided a sufficient amount of return for letting the carriage continue to the subsequent HPSW detecting operation and printing operation.

Reference is now made to FIG. 17 to describe the operation procedure of the timer process by the CPU 11 for executing the stepping motor control of FIG. 16.

In FIG. 17, at step S1, the timer process is started, and at step S2, the phase of the stepping motor to be excited is renewed by one on the basis of the phase pointer MTPC, whereafter at step S3, the phase to be excited is output to the motor driving IC 15 on the basis of the renewal of the step S2 to thereby drive the motor by one step.

At step S4, a direction movement flag "RT" is discriminated, and if it is "0", the rotation in the direction A in FIG. 17 is indicated, and if it is "1", the rotation in the direction B is indicated. RT is preset to RT="0" in the main process, and if at the step S4, YES (RT=0), advance is made to step S5 to rotate the motor in the direction A.

At the step S5, a counter PACNT for indicating the amount of movement of the carriage 105 is incremented, and at step S6, whether the value of the counter PACNT is n1 or less is discriminated.

If the value of the counter PACNT is n1 or less, at step S9, return is made to the main process, but if said value exceeds n1, at step S7, the direction movement flag RT is rendered into "1", and at step S8, the value of the counter PACNT is rendered into "0", whereafter at step S9, return is made to the main process.

By the steps S7 and S8 being executed, during the next timer interruption, the direction movement flag RT becomes RT="1" at the step S4, and advance is made to step S10.

At the step S10, the counter PACNT is incremented, and at step S11, whether the counter PACNT is n2 is discriminated.

If the counter PACNT is n2 or less, at the step S9, return is made to the main process, but if it exceeds n2, at step S12, the motor is deenergized, and at step S13, a flag INEF is rendered into "1", thereby indicating that the series of processes have been terminated.

Figure 18:
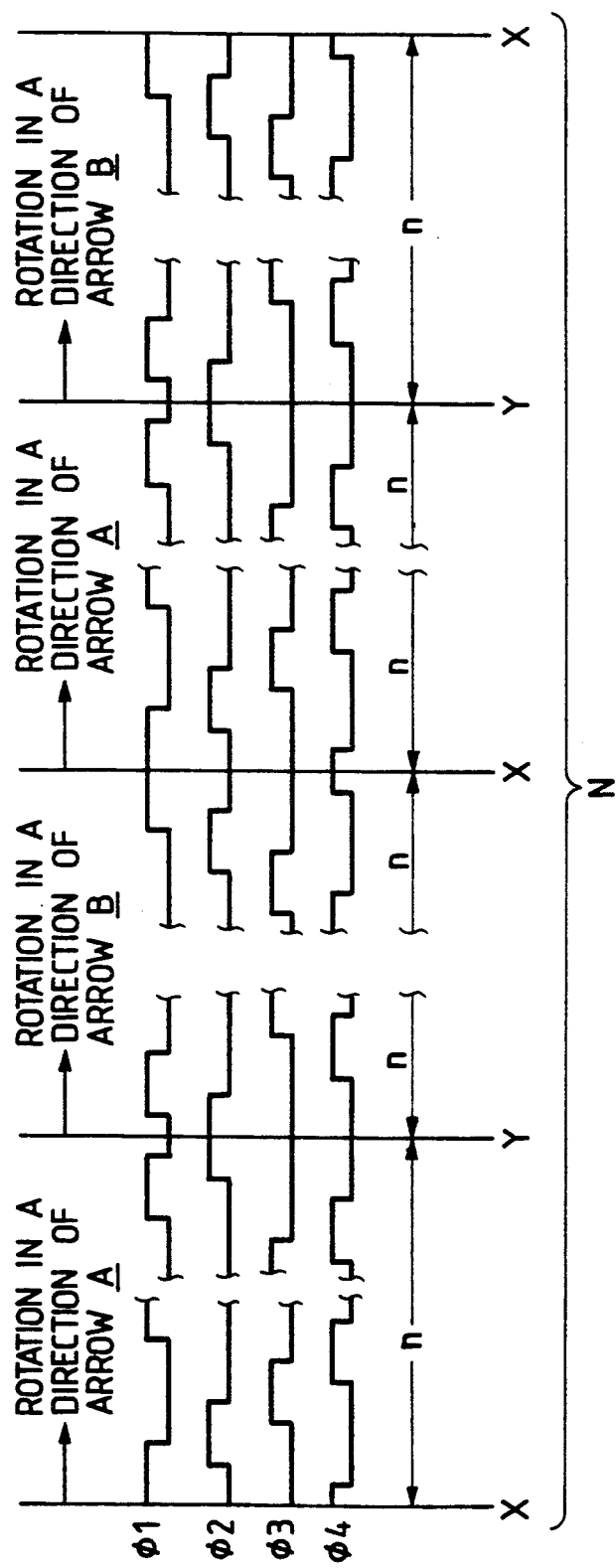
FIG. 18 is a control time chart of the stepping motor of a recording apparatus according to another embodiment of the present invention.

In the above-described embodiment (Embodiment 1), the stepping motor 107 has been controlled so that as shown in FIG. 16, the stepping motor is rotated by n1 steps in the direction A, and thereafter is rotated by n2 steps in the direction B. However, in the following embodiment (Embodiment 2), as shown in FIG. 18, the stepping motor 107 is rotated by n steps in the direction A and rotated by n step in the direction B, whereafter it is rotated by n steps in the direction A and further rotated by n steps in the direction B. Thus, the stepping motor 107 is controlled so that forward and reverse rotations thereof are repeated a predetermined number of times.

Description will hereinafter be made of Embodiment 2 in which the aforementioned number of times of repetition can be set to N times.

Figure 19:
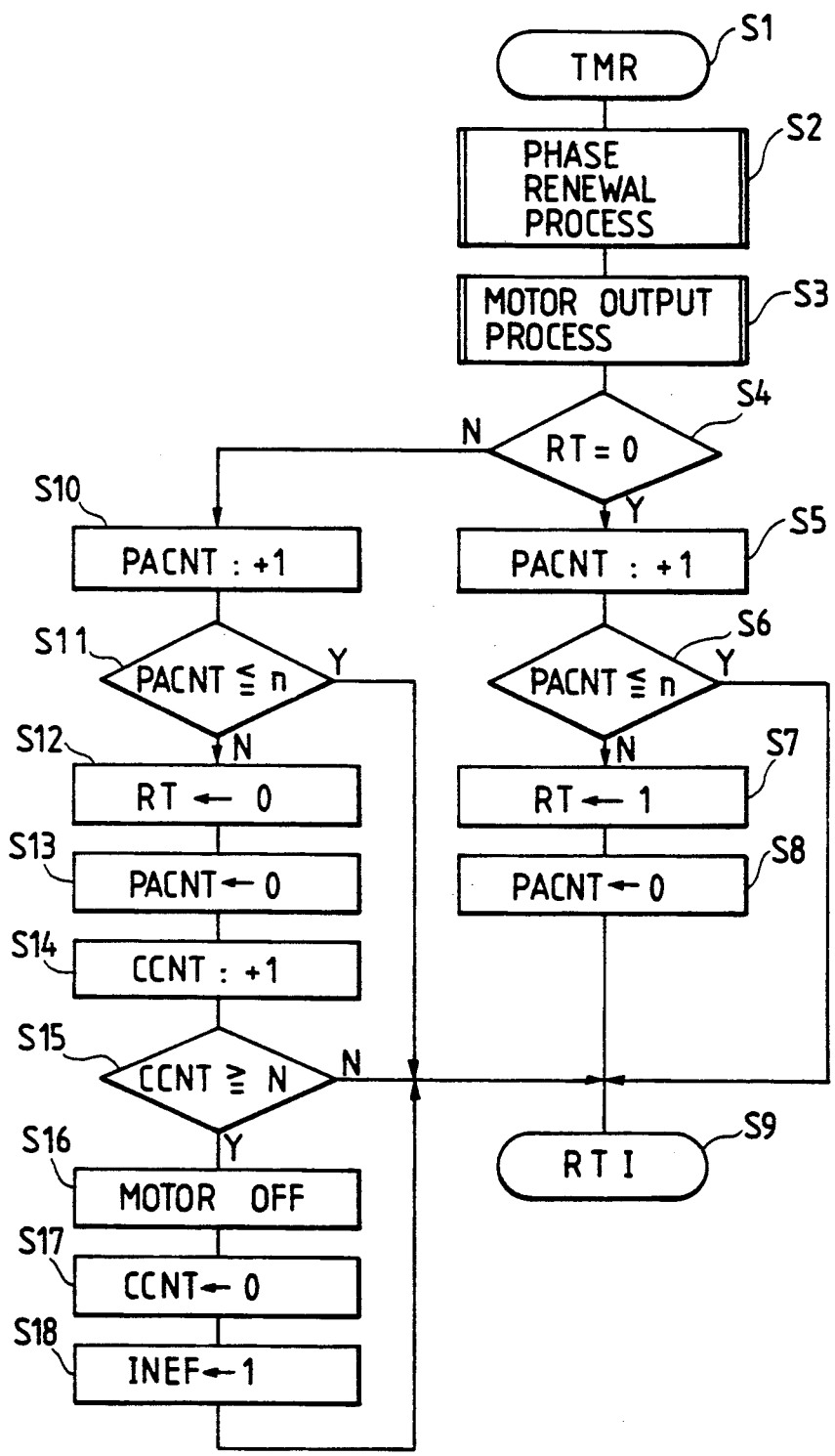
FIG. 19 is a flow chart of the timer process by the CPU for executing the motor control of FIG. 18.

FIG. 18 shows a control time chart of the stepping motor 107 in Embodiment 2, and FIG. 19 is a flow chart of the timer process by the CPU 11 for driving the stepping motor as per the control time chart thereof shown in FIG. 18.

Again in the case of the present embodiment, the system block diagram of FIG. 14 can be intactly used and therefore, description will hereinafter be made with FIG. 14 adopted.

Also in the present embodiment, the state in which the crest of the leading tooth of the belt-driving pulley 125 and the crest of the leading tooth of the toothed portion 106C of the timing belt 106 run on each other and the mechanism with which meshing engagement restores its normal state by the repetition of the reversing operation are the same as in the case of the afore-described Embodiment 1 and therefore, they need not be described.

The operation procedure of the timer process by the CPU 11 for executing the stepping motor control of FIG. 18 will now be described with reference to FIG. 19.

In FIG. 19, at step S1, the timer process is started, and at step S2, the phase of the stepping motor 107 to be excited is output to the motor driving IC 15 to thereby drive the motor 107 by one step.

At step S4, the direction movement flag "RT" is discriminated, and if it is "0", the rotation in the direction A in FIG. 10 is indicated, and if it is "1", the rotation in the direction B is indicated.

RT is preset to RT="0" in the main process, and if at step S4, the discrimination is YES (RT=0), advance is made to step S5 to rotate the motor in the direction A.

At the step S5, the counter PACNT for indicating the amount of movement of the carriage 105 is incremented, and at step S6, whether the value of the counter PACNT is n or less is discriminated.

If said value is n or less, at step S9, return is made to the main process, but if said value exceeds n, at step S7, the direction movement flag RT is rendered into "1", and at step S8, the counter PACNT is rendered into "0", whereafter at the step S9, return is made to the main process.

Next, if at the step S4, the direction movement flag RT="1" (if the steps S7 and S8 have been passed), advance is made to step S10, where the counter PACNT is incremented, and at step S11, whether the counter PACNT is n or less is discriminated.

If the counter PACNT is n or less, at the step S9, return is made to the main process, but if it exceeds n, at step S12, the direction movement flag RT is rendered into "0", and at step S13, the counter PACNT is rendered into "0", whereafter at step S14, a repetition number counter CCNT is incremented.

Subsequently, at step S15, whether the repetition number counter CCNT is a preset repetition number N or greater is discriminated.

If the counter CCNT is less than N, at the step S9, return is made to the main process.

If the counter CCNT is N or greater, at step S16, the motor is deenergized and at step S17, the counter CCNT is rendered into "0", whereafter at step S18, the flag INEF is rendered into "1", thereby indicating that the series of processes have been terminated.

According to the above-described embodiment, in the course of operation wherein return is made by the reverse rotation of the belt-driving pulley 125 in the direction A so that the driving pulley 125 and the toothed portion 106C of the timing belt 106 again come into meshing engagement with each other, the stepping motor 107 is controlled so that the operation of reversely rotating the stepping motor 107 which is the drive source by a predetermined amount in the direction A, thereafter forwardly rotating the stepping motor 107 by a predetermined amount in the direction B is repeated at least one time. So, it has become possible to reliably prevent the occurrence of the state in which as heretofore experienced, the crests of the teeth of the belt-driving pulley 125 and the crests of the toothed portion 106c of the timing belt 106 run on each other.

In the above-described embodiment, the driving of the stepping motor 107 has been effected in the 1-2 phase excitation system, but it can be likewise carried out in any other excitation system (for example, the 2-2 phase excitation) to thereby achieve a similar effect.

Still another embodiment of the present invention will now be described with reference to FIGS. 20 to 26. In the embodiment which will now be described, the phenomenon that when the toothed portion of the timing belt passes an idler timing pulley, the crest of the tooth of the toothed portion runs on the crest of the tooth of the idler timing pulley is prevented by modifying the construction of the belt. This embodiment can also be applied to the aforedescribed recording apparatus.

Now, the embodiment which will now be described is a recording apparatus of the type in which when the untoothed portion advances and the toothed portion of the timing belt passes the idler timing pulley, the crests of the teeth of the two are prevented from running on each other, whereby the instability of the carriage feeding by the fluctuation of the tension of the timing belt or a shock is eliminated and the carriage feeding and paper feeding are effected by a single drive source designed to secure the quality of printing.

An embodiment to which the present invention is applied will hereinafter be described specifically with reference to the drawings.

Figure 20:
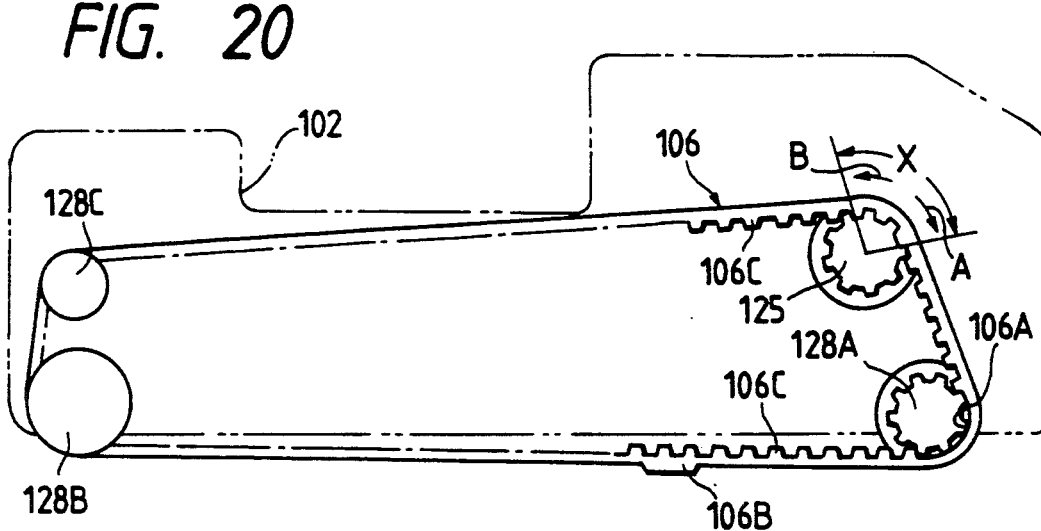
FIG. 20 is a plan view of the timing belt of a recording apparatus according to an embodiment of the present invention and showing a state in which the untoothed portion thereof is at the location of a timing idler pulley.
Figure 21:
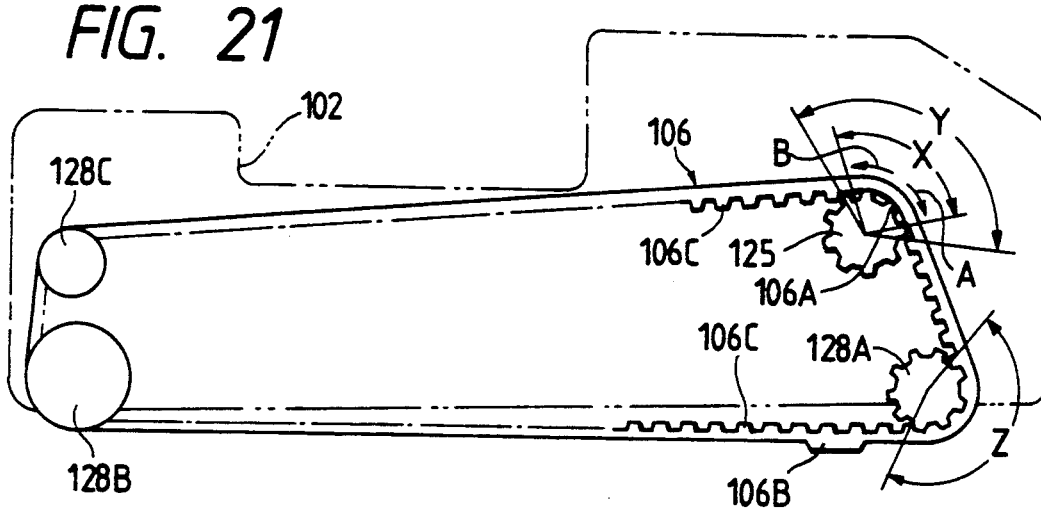
FIG. 21 is a plan view also of the timing belt of FIG. 20 and showing a state in which the untoothed portion thereof is at the location of a belt-driving pulley.
Figure 22:
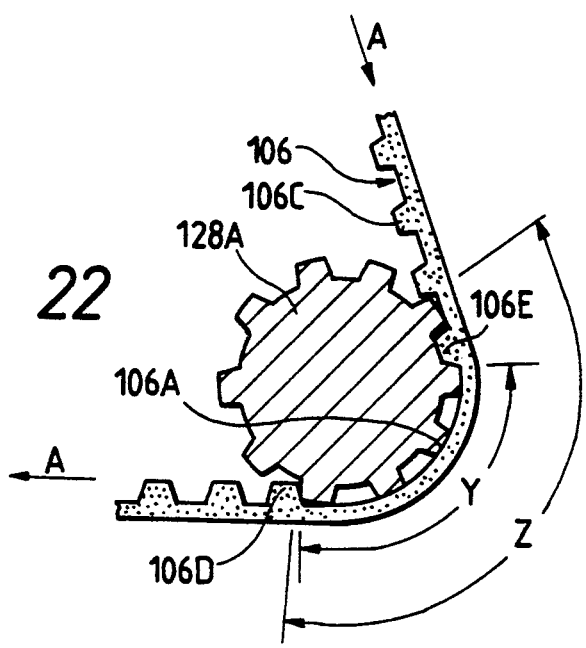
FIG. 22 is a fragmentary enlarged plan view of the timing idler pulley of FIG. 20.

FIG. 20 is a plan view of the timing belt of a recording apparatus according to an embodiment of the present invention showing a state in which the untoothed portion of the timing belt is at the location of a timing idler pulley, FIG. 21 is a plan-view of the timing belt of FIG. 20 showing a state in which the untoothed portion thereof is at the position of the belt-driving pulley, and FIG. 22 is a fragmentary enlarged plan view showing the state of the contact between the timing idler pulley and the timing belt in FIG. 20.

The present invention, as described with respect to the previous embodiment, is applied to a recording apparatus designed such that the carriage driving and paper feeding are executed by a single drive source, and the difference of the present embodiment from the aforedescribed recording apparatus are limited to the timing belt 106, idler pulleys 128A, 128B, 128C, etc., and in the other points, the present embodiment is substantially the same as the aforedescribed recording apparatus.

Accordingly, these differences will hereinafter be described in detail.

FIG. 20 is a plan view showing the state of extension of the timing belt 106 which is extended over the belt-driving pulley 125, the timing idler pulley 128A and the idler pulleys 128B, 128C when the carriage 105 is in the normal printing operation as shown in FIGS. 9 and 11.

FIG. 21 shows the timing belt 106 and its surrounding members in a state in which as shown in FIGS. 10 and 12, the carriage 105 bears against the right regulating wall 101B of the frame 101, i.e., the continuous paper feeding state.

FIG. 22 shows on an enlarged scale the portion in which the timing idler pulley 128A at the location of the timing belt 106 of FIG. 20 and the timing belt 106 mesh with each other.

In FIGS. 20 to 22, during continuous paper feeding, the untoothed portion 106A of the timing belt 106 and the belt-driving pulley 125 slide in the portion of contact therebetween and rotate idly and therefore, it becomes necessary that the untoothed portion 106A of the timing belt 106 has a sufficient length in the portion thereof which contacts with the belt-driving pulley 125.

If the length of the untoothed portion 106A is not sufficient, it will be conceived that when as shown in FIG. 12 corresponding to FIG. 21, the carriage 105 bears against the right regulating wall of the frame 101 and is limited in its movement, the tooth of the belt-driving pulley 125 remains in meshing engagement with the tooth of the timing belt 106. If in that state, the motor 107 is rotated in the direction B in FIG. 21 to thereby effect the continuous paper feeding operation, the belt-driving pulley 125 and the timing belt 106 will skip their teeth to impart an excessively great load to the stepping motor and in addition, cause abnormal sound or vibration.

Therefore, the length of the untoothed portion 106A of the timing belt need be set to a value greater than the length of meshing engagement (the circumferential length of contact) between the belt-driving pulley 125 and the timing belt.

On the other hand, in the timing idler pulley 128A which is a follower pulley having a meshing tooth, it is necessary to prevent the crest of the tooth of the toothed portion 106C of the timing belt 106 from running on the crest of the tooth of the timing idler pulley 128A.

To continue the printing operation, it is necessary to rotate the stepping motor 107 in the direction of arrow A in FIG. 20 to move the carriage 105 leftwardly to thereby raise the column.

Now, in the recording apparatus of FIGS. 20-22, setting is made so that when in the process of raising the column, the untoothed portion 106A of the timing belt 106 comes near the timing idler pulley 128A as shown in FIG. 22, the tooth 106E immediately after the untoothed portion 106A of the timing belt 106 may mesh with the timing idler pulley 128 before the tooth 106D immediately before the untoothed portion 106A of the timing belt 106 completely separates from the timing idler pulley 128A.

If so set, when the untoothed portion 106A of the timing belt 106 passes the timing idler pulley 128A, the tooth 106E after the untoothed portion 106A meshes with the timing idler pulley 128A while the timing idler pulley 128A is synchronously rotated by the tooth 106D of the timing belt 106 and therefore, the timing idler pulley 128A does not become free and accordingly, the tooth 106E can smoothly mesh with the timing idler pulley 128A.

By thus setting the length of meshing engagement (the circumferential length of contact) between the timing idler pulley 128 and the timing belt 106 to a value greater than or equal to the length of the untoothed portion 106A of the timing belt, the tooth 106E of the timing belt 106 can be prevented from running on the tooth of the timing idler pulley 128A.

What is important here is that the distance between the teeth 106D and 106E located before and after the untoothed portion 106A is set to an integer times the pitch of the teeth of the timing belt 106.

Thus, in the recording apparatus of the present embodiment, when the length of meshing engagement between the belt-driving pulley 125 and the timing belt 106 is X and the length of the untoothed portion 106A of the timing belt 106 is Y and the length of meshing engagement between the timing idler pulley 128A and the timing belt 106 is Z, design is made such that there is established the relation that $$Z \geq Y > X.$$

By the construction as described above, the occurrence of abnormal sound or vibration during the continuous paper feeding can be prevented and also, the level difference and shock between the untoothed portion 106A and the toothed portion 106C in the meshing engagement between the timing idler pulley 128A and the timing belt 106 can be suppressed with a result that there is provided a recording apparatus which can eliminate unsatisfactory printing.

Figure 23:
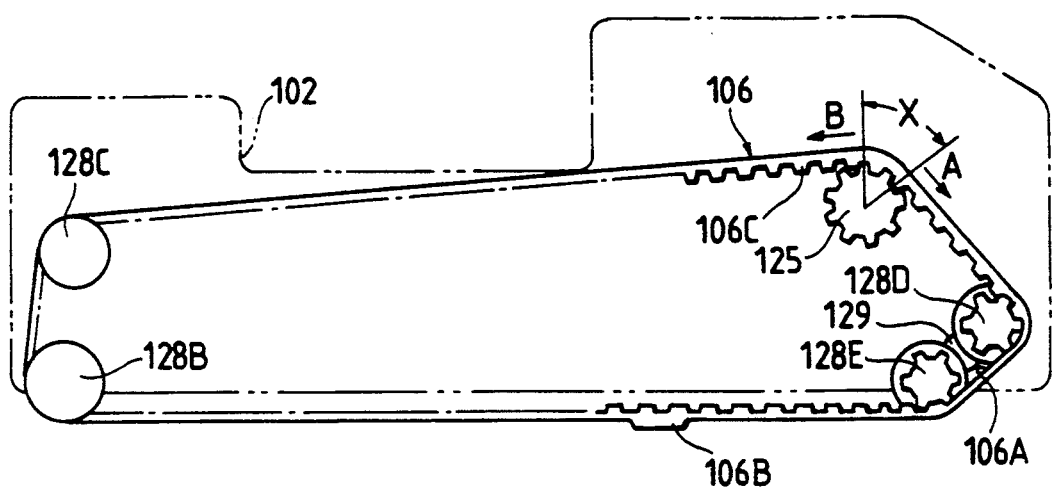
FIG. 23 is a plan view of the timing belt of a recording apparatus according to another embodiment of the present invention and showing a state in which the untoothed portion thereof is at the location of a timing idler pulley.
Figure 24:
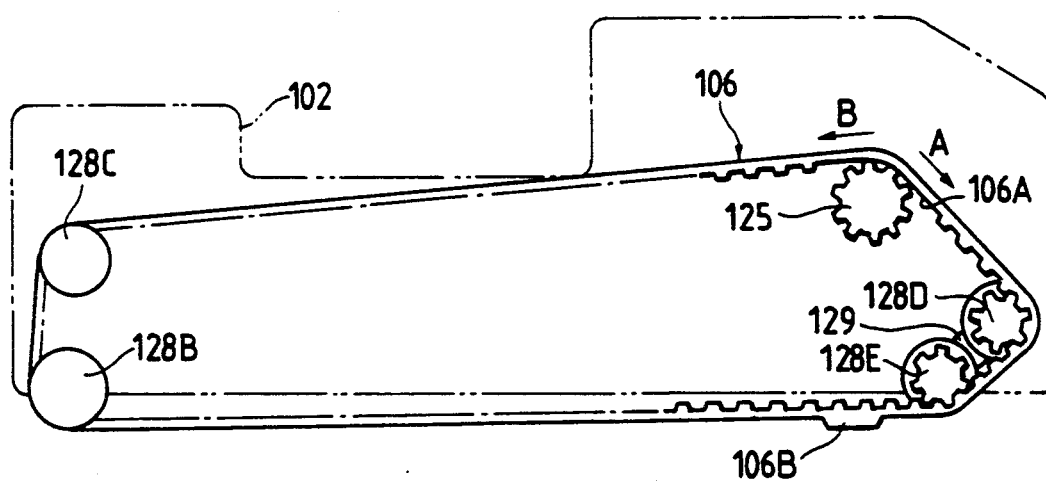
FIG. 24 is a plan view also of the timing belt of FIG. 23 and showing a state in which the untoothed portion thereof is at the location of a belt-driving pulley.
Figure 25:
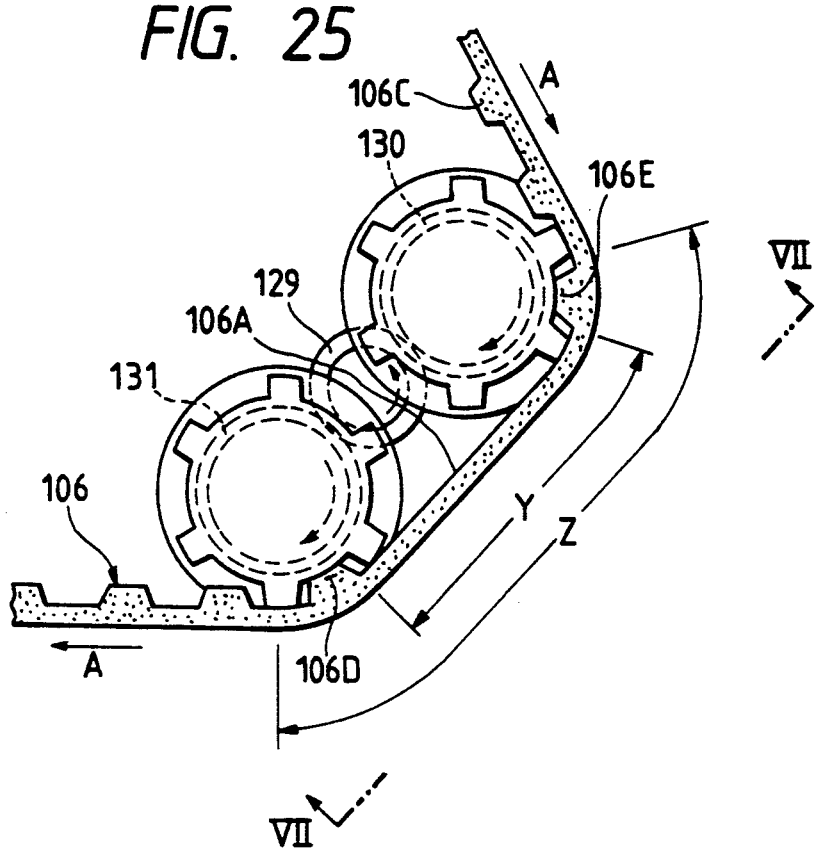
FIG. 25 is a fragmentary enlarged plan view of the timing idler pulley of FIG. 23.
Figure 26:
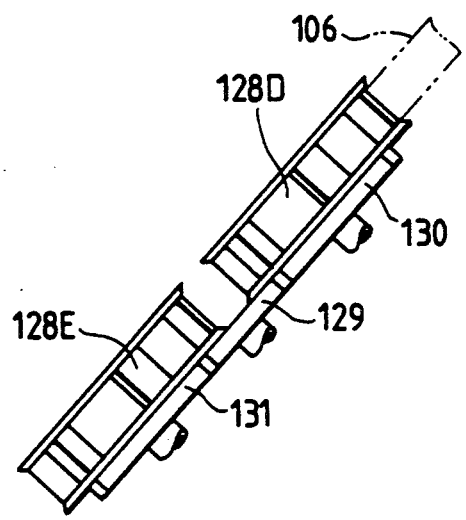
FIG. 26 is a fragmentary enlarged side view taken along line VII—VII of FIG. 25.

FIG. 23 is a plan view of the timing belt of a recording apparatus according to another embodiment of the present invention and showing a state in which the untoothed portion thereof is at the position of, the timing idler pulley, FIG. 24 is a plan view showing a state in which the untoothed portion of the timing belt of FIG. 23 is at the location of the belt-driving pulley, FIG. 25 is a fragmentary enlarged plan view showing the state of contact between the timing idler pulley and the timing belt in FIG. 23, and FIG. 26 is a fragmentary side view taken along line VII—VII in FIG. 25.

The embodiment of FIGS. 23-26 is also carried out in a recording apparatus designed such that the carriage driving and paper feeding are executed by the single drive source (the stepping motor 107) described with reference to FIGS. 8 to 18.

The present embodiment is one in which instead of the timing idler pulley 128A of FIGS. 20-22, a follower pulley with meshing teeth comprising two timing idler pulleys with teeth is used to set the length of meshing engagement between the timing belt 106 and the follower pulley to a great value.

In the other points, the present embodiment is substantially the same as the embodiments described with reference to FIGS. 20-22 and FIGS. 2-12, and the corresponding portions thereof are designated by identical reference numerals and the duplicate portions thereof need not be described.

In FIGS. 23-26, the follower pulley having meshing teeth is comprised of two timing idler pulleys 128D and 128E arranged side by side.

The timing idler pulleys 128D and 128E are provided with gear portions 130 and 131, respectively, which are rotatable as unit, and an idler gear 129 meshing with these gear portions 130 and 131 is provided between the gear portions.

The two timing idler pulleys 128D and 128E are equal in number of teeth and pitch circle to each other, and the gear portions 130 and 131 thereof are also equal in number of teeth and pitch circle to each other, and the two timing idler pulleys 128D and 128E are rotated in the same direction and at the same pitch.

So, when the length of meshing engagement between the belt-driving pulley 125 and the timing belt 106 is X and the length of the untoothed portion 106A of the timing belt 106 is Y and the length of meshing engagement between the follower pulley comprising the two timing idler pulleys 128D and 128E and the timing belt 106 is Z, design is made such that again in the present embodiment, there is established the relation that $$Z \geq Y > X.$$

In the above-described construction, in order to perform the printing operation, the stepping motor 107 is rotated in the direction A so as to move the carriage 105 leftwardly to raise the column, and the timing belt 106 is moved in the direction A. Thereupon, when in that process, the untoothed portion 106A of the timing belt 106 comes near the timing idler pulleys 128D and 128E as shown in FIG. 25, the tooth 106E immediately after the untoothed portion 106A comes into meshing engagement with the timing idler pulley 128D before the tooth 106D immediately before the untoothed portion 106A completely separates from the timing idler pulley 128E.

The timing idler pulley 128E is being rotated in synchronism with the timing belt 106 by the tooth 106D thereof and therefore, the timing idler pulley 128D is also being rotated in synchronism with the timing belt 106 by the idle gear 129 and gears 130 and 131. In that state, the tooth 106E comes near the timing idler pulley 128D and therefore, this tooth 106E can smoothly mesh with the timing idler pulley 128D.

Also, the timing idler pulleys 128D, 128E and the timing belt 106 need be set so that they synchronize with one another.

Thus, the tooth 106E of the timing belt 106 can be prevented from running on the teeth of the timing idler pulleys 128D and 128E.

In this manner, the two timing idler pulleys 128D and 128E are arranged side by side and are rotated in synchronism with each other, whereby the length of meshing engagement Z between the follower pulleys 128D, 128E having meshing teeth and the timing belt 106 can be made great.

Thus, according to the embodiment of FIGS. 23-26, there is obtained the same effect as that of the embodiment of FIGS. 20-22. Besides, the length of meshing engagement Z between the follower pulleys 128D, 128E with teeth and the timing belt 106 can be freely set to a great value and therefore, it has become possible to enhance the degree of freedom in designing when carrying out the present invention.

Another embodiment to which the present invention is applied will now be described with reference to FIGS. 27 to 30. The embodiment which will now be described is one in which the phenomenon of the teeth running on each other is prevented by forming the shape of at least one of the teeth of the toothed portions located at the opposite ends of the untoothed portion of the timing belt into such a shape that it is difficult for the tooth of the pulley to run thereon.

The present embodiment will hereinafter be described by the use of the continuous paper feeding operation performed before or after the termination of recording in the aforedescribed recording apparatus.

Figure 27A:
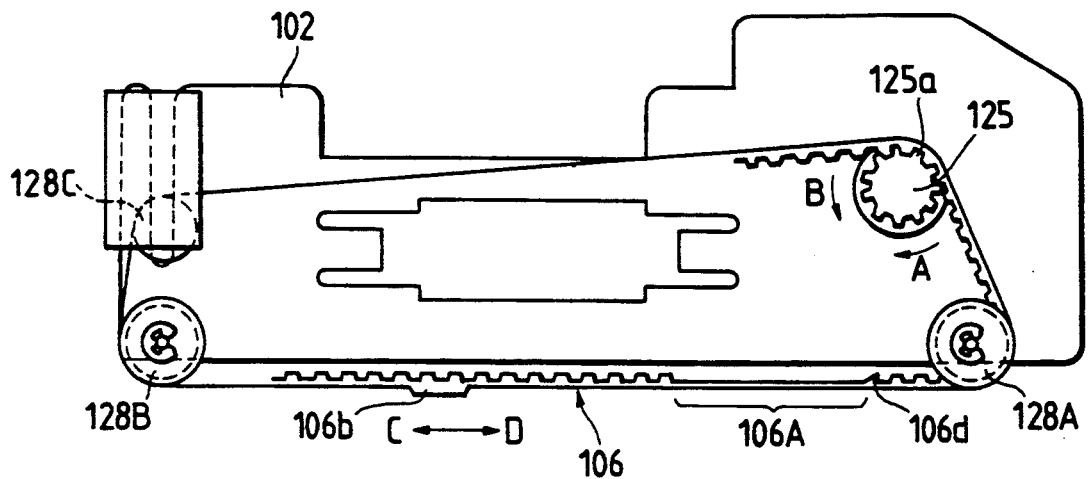
FIGS. 27A and 27B illustrate the structure of the timing belt of the carriage driving mechanism of a recording apparatus according to an embodiment of the present invention and the positional relation thereof to a driving pulley driving the recording operation or the carriage returning operation and the continuous paper feeding operation, respectively.
Figure 27B:
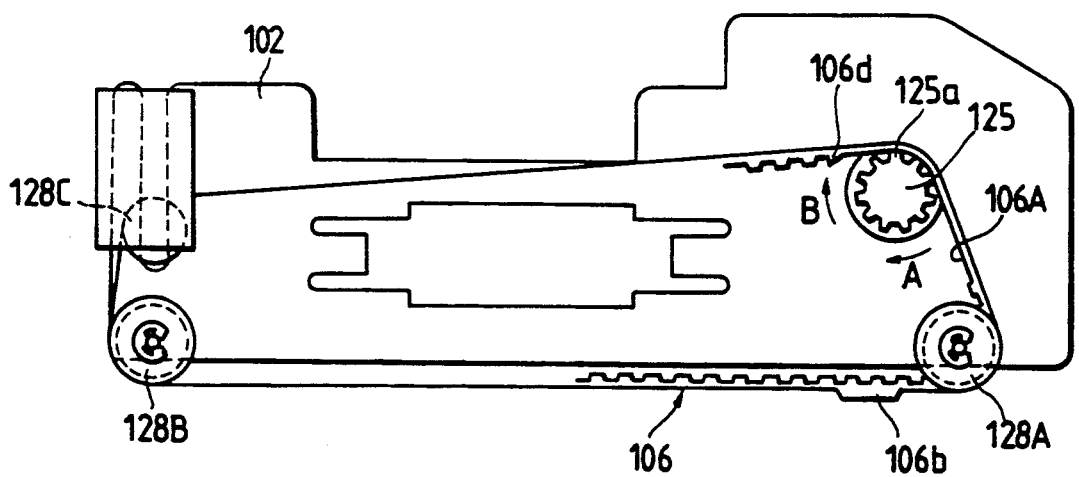
Figure 28A:
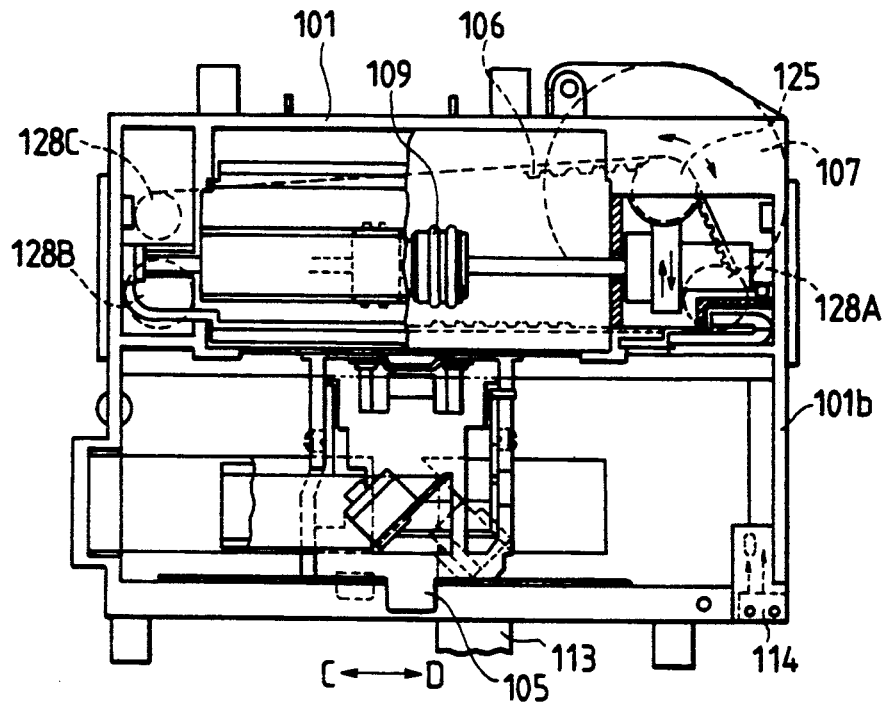
FIGS. 28A and 28B illustrate the positional relations of the carriage to the frame which correspond to FIGS. 27A and 27B.

FIGS. 27A and 28A show the positional relation of the timing belt 106 to the driving pulley 125 during the above-described recording operation or the carriage returning operation and the positional relation of the carriage 105 to the frame 101, respectively. In contrast, FIGS. 27B and 28B show the positional retations during the continuous paper feeding.

As is apparent from these figures, the recording operation or the carriage returning operation is performed in a state in which the toothed portion of the timing belt 106 is in meshing engagement with the driving pulley 125 and a state in which the carriage 105 is not present at the home position. In contrast, the continuous paper feeding operation is performed in a state in which as shown in FIG. 28B, the carriage 105 is at the home position and bears against the right wall 101b of the frame 101 as viewed in the figure and the untoothed portion 106A of the timing belt 106 is in contact with the driving pulley 125 as shown in FIG. 27B. That is, the positional relation is such that when the carriage 105 is moved to the home position, the untoothed portion 106a of the timing belt 106 contacts with the driving pulley 125.

Figure 28B:
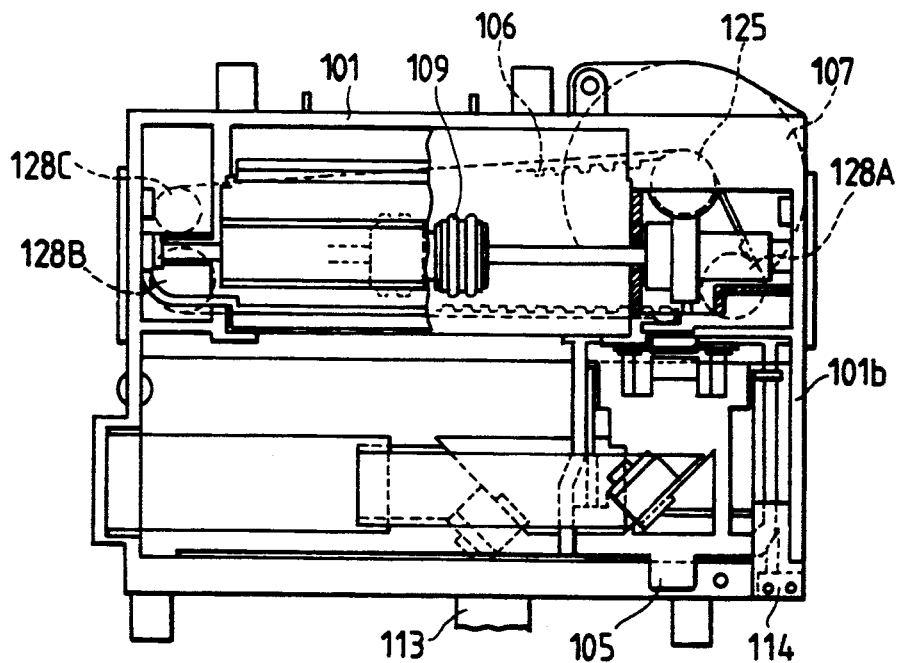

During the continuous paper feeding operation, in the state shown in FIG. 28B, the driving pulley 125 and worm gear 126 are continuously rotatively driven in the direction B. In this case, the timing belt 106 tries to run counter-clockwise as viewed in the figure by a frictional force acting between the driving pulley 125 and the untoothed portion 106A of the timing belt 106. However, it is prevented because the carriage 105 bears against the wall 101b of the frame 101, and the driving pulley 125 rotates idly relative to the timing belt 106 and the carriage 105 is forcibly stopped at the home position. In contrast, by the rotation of the worm gear 126 in the direction B, the paper feed roller 109 is rotatively driven in the manner described previously, whereby recording paper 111 is continuously fed.

When the recording operation is to be performed after the continuous paper feeding operation is terminated, the driving pulley 125 is rotatively driven in the direction A from the state shown in FIG. 28B. The timing belt 106 runs clockwise as viewed in the figure by the frictional force between the untoothed portion 106A of the timing belt 106 and the driving pulley 125. In this case, the carriage 105 is moved in the direction C and separates from the wall 101b of the frame and therefore, the movement thereof is not regulated. Also, the driving pulley 125 does not rotate idly relative to the timing belt 106, which runs clockwise by the frictional force.

Figure 29A:
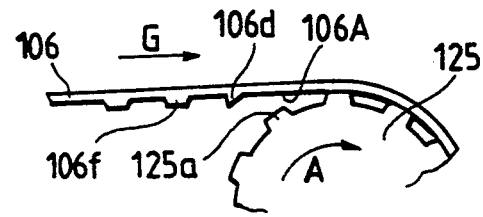
FIGS. 29A–29C illustrate the shift operation of the untoothed portion to the toothed portion of the timing belt relative to the driving pulley.
Figure 29B:
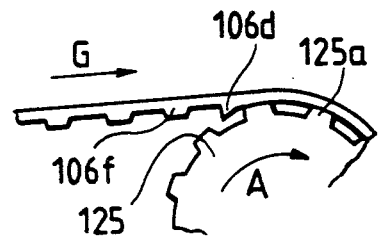
Figure 29C:
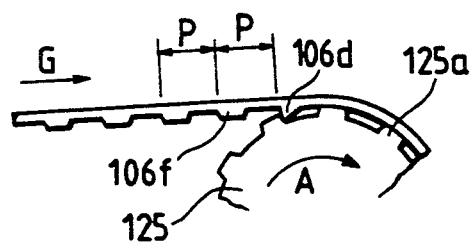

After as shown in FIGS. 29A-29C, the timing belt 106 is moved a little in the direction of arrow G by the frictional force, a tooth 106d located in face-to-face relationship with the end of the untoothed portion 106A meshes with the tooth 125a of the driving pulley 125. The teeth succeeding to the tooth 106d successively come into meshing engagement with the tooth 125a of the driving pulley 125, whereby the transmission of drive force by the meshing engagement between the driving pulley 125 and the toothed portion of the timing belt 106, and the carriage 105 is moved in the direction C as previously described, whereby the recording operation can be performed.

In the present embodiment, when as shown in FIGS. 29A-29C, the timing belt 106 is moved in the direction of arrow G relative to the driving pulley 125 and the tooth 106d of the toothed portion thereof comes into meshing engagement with the tooth 125a of the driving pulley 125, the rate at which the tooth 125a of the driving pulley 125 runs on the tooth 106d is very small as compared with the prior art, because the cross-sectional shape of the tooth 106d is triangular.

That is, the tooth top of the tooth 106d is a line and is very small in area, and the rate at which the tooth top of the tooth 125a of the driving pulley 125 overlaps with this tooth top is very much smaller than the rate at which the conventional flat tooth tops overlap with each other. The rate at which as shown in FIG. 30, the tooth 125a of the driving pulley 125 bears against the inclined surface 106g of the tooth 106d which is adjacent to the untoothed portion 106A or bears against the inclined surface 106e which is adjacent to the toothed portion becomes great.

Figure 30:
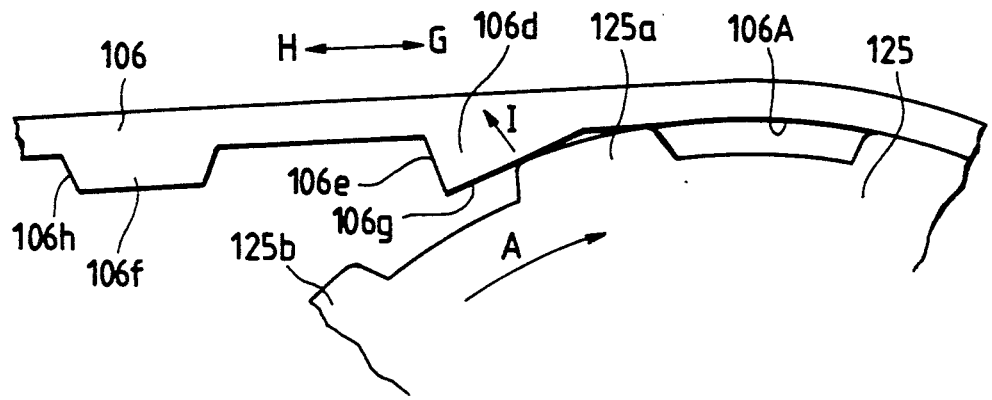
FIG. 30 illustrates the action by the cross-sectional shape of a tooth located in face-to-face relationship with the end of the untoothed portion of the timing belt.

When as shown in FIG. 30, the tooth top of the tooth 125a of the driving pulley 125 bears against the inclined surface 106d, the timing belt 106 in the inclined surface 106g thereof is subjected from a reaction force in the direction of arrow I from the tooth 125a of the driving pulley 125. Thus, the timing belt deviates a little in the direction of arrow H relative to the driving pulley 125, and the tooth 125a of the driving pulley 125 slips down from the inclined surface 106g and the next tooth 125b of the driving pulley 125 bears against the opposite inclined surface 106e of the tooth 106d.

Here, the inclined surface 106g of the tooth 106d is a gently inclined surface, while the inclined surface 106e is an inclined surface corresponding to the corresponding inclined surface (the inclined surface on the opposite side of the untoothed portion 106A) 106h of another tooth (e.g. 106f in FIG. 30) of the toothed portion, and a sharply inclined surface nearly vertical to the body portion of the timing belt 106. Also, the distance between the inclined surface 106e of the tooth 106d and the corresponding inclined surface 106h of the next tooth 106f is the same distance as the pitch P of the teeth of the timing belt 106, as shown in FIG. 29C.

With such a construction, at a point of time whereat the tooth 125a of the driving pulley 125 bears against and meshes with the inclined surface 106e of the tooth 106d, the positional relation between the timing belt 106 and the driving pulley 125 becomes such a positional relation that they mesh normally with each other. Then, the teeth 106f and so on succeeding to the tooth 106d of the timing belt 106 will successively mesh normally with the teeth of the driving pulley 125.

Thus, according to the present embodiment, when a shift is made to the recording operation after the termination of the continuous paper feeding operation, the tooth 125a of the driving pulley 125 can be prevented from running on the tooth of the timing belt 106, and the occurrence rate of such run-on can be suppressed to a level markedly lower than in the prior art. Thus, during the shift to the recording operation, the timing belt 106 can be moved stably and the carriage 105 can be moved stably to thereby accomplish recording of high quality.

In the above-described embodiment, the cross-sectional shape of only one of the teeth of the toothed portion of the timing belt which are located at the opposite ends of the untoothed portion thereof is made triangular, but the cross-sectional shapes of both of the teeth at the opposite ends may be made triangular as required. The structure of the timing belt as described above can of course be applied not only to the carriage driving mechanism of a recording apparatus, but also is equally applicable to a timing belt driving mechanism used as a driving mechanism in various instruments.

Still another embodiment of the timing belt will now be described with reference to FIGS. 31 and 32.

Figure 31:
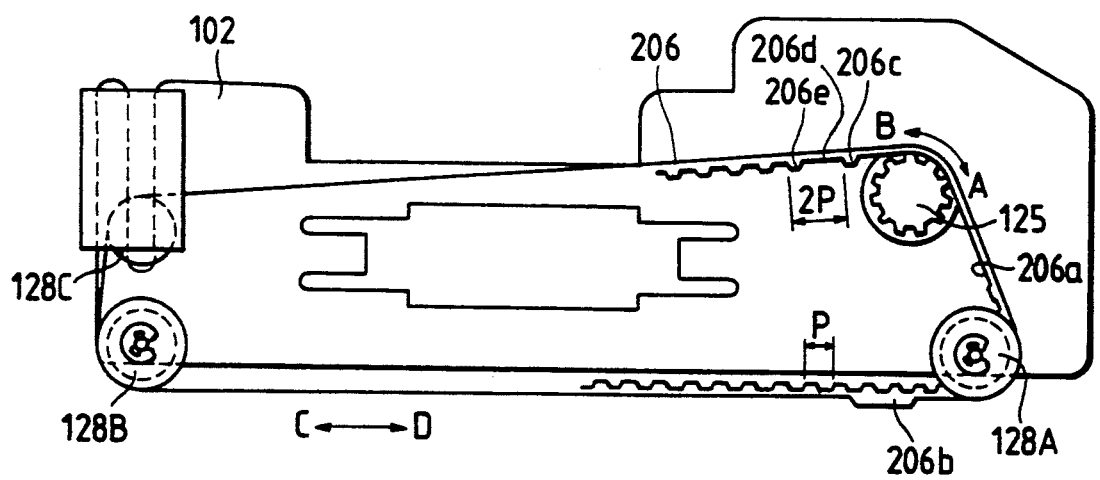
FIG. 31 illustrates the structure and operation of the timing belt of the carriage driving mechanism of a recording apparatus according to an embodiment of the present invention.

The structure of the timing belt in the present embodiment is such as shown in FIG. 31. That is, the inner side of the timing belt 206 is formed with teeth at a predetermined pitch P corresponding to the pitch of the teeth of pulleys 125 and 128A–128C. The cross-sectional shape of the respective teeth along the lengthwise direction of the belt corresponds to the cross-sectional shape of the teeth of the pulleys 125 and 128A–128C, i.e., is a substantially trapezoidal shape approximate to a rectangle. The inner side of the timing belt 206 is provided with an untoothed portion over a predetermined length as indicated by 206a.

The difference of this construction from the conventional construction is in the toothed portion of the timing belt 206, the distance between the corresponding portions (for example, the left side surfaces in FIG. 31) of a tooth (hereinafter referred to as the first tooth) 206c located in face-to-face relationship with the left end of an untoothed portion 206a as viewed in FIG. 31 and a tooth (hereinafter referred to as the second tooth) 206e neighboring the first tooth 206c is set to twice the pitch P of the teeth of the timing belt, i.e., 2P. The action by such setting will be described later.

Further, a protruding portion 206b for determining the coupled position of the carriage 105 to the timing belt 206 at a predetermined position is projectedly provided at a predetermined location on the outer side of the timing belt 206.

The action of the belt 206 will now be described. When the recording operation is to be performed after the continuous paper feeding operation is terminated, the driving pulley 125 is rotatively driven in the direction A from the state shown in FIGS. 31 and 28B. The timing belt 206 is moved clockwise as viewed in FIG. 31 by the frictional force between the untoothed portion 206a of the timing belt 206 and the driving pulley 125. In this case, the carriage 105 is moved in the direction C and separates from the wall 101b of the frame and therefore, the movement thereof is not regulated. The driving pulley 125 does not rotate idly relative to the timing belt 206, which is thus moved clockwise by the frictional force.

After the timing belt 206 is moved a little by the frictional force, the first tooth 206c located in face-to-face relationship with the end of the untoothed portion 206a meshes with the tooth of the driving pulley 125, and the teeth succeeding to the first tooth 206c successively meshes with the tooth of the driving pulley 125 and thus, the transmission of drive force by the meshing engagement between the driving pulley 125 and the toothed portion of the timing belt is effected, whereby the carriage 105 can be moved in the direction C as previously described to thereby accomplish the recording operation.

Here, the distance between the corresponding portions of the first tooth 206c at the end of the untoothed portion 206a of the timing belt 206 and the second tooth 206e neighboring the first tooth is set to twice the pitch P of the teeth of the timing belt 206, i.e., 2P. Therefore, during the shift from the untoothed portion 206a to the toothed portion of the timing belt 206 relative to the driving pulley 125, the tooth of the driving pulley 125 is prevented from running on the tooth of the timing belt. This state is shown in FIGS. 32A–32D.

Figure 32A:
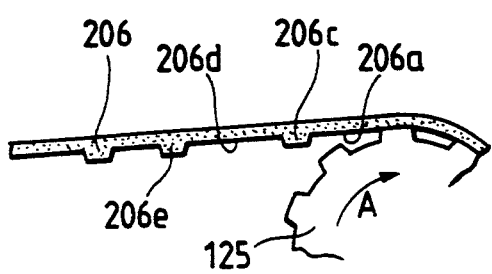
FIGS. 32A–32D illustrate the shift operation of the untoothed portion to the toothed portion of the timing belt into the meshing engagement with the driven pulley.
Figure 32B:
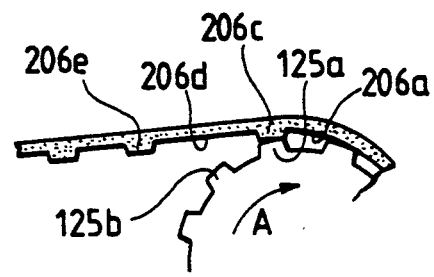
Figure 32C:
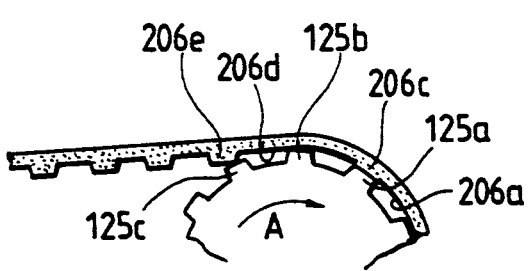
Figure 32D:
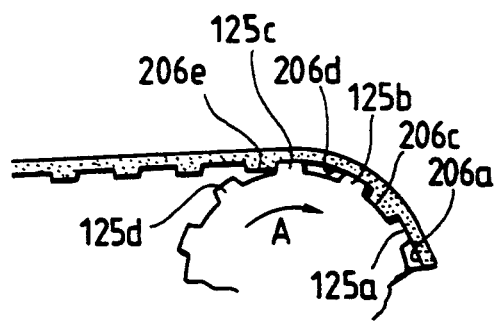

That is, let it be assumed that during the above-mentioned shift, a certain tooth 125a of the driving pulley 125 runs right on the first tooth 206c at the end of the timing belt 206 in the manner as shown in FIGS. 32A to 32B. In this case, with the rotation of the driving pulley 125 in the direction A, the next tooth 125b of the driving pulley 125 comes into the inter-tooth portion 206d between the first tooth 206c of the timing belt 206 and the second tooth 206e neighboring the first tooth, as shown in FIGS. 32B to 32C. If a tooth is present in the inter-tooth portion 206d as in the prior art, the tooth 125b ought to run right on that tooth and the next tooth 125c ought to run right on the second tooth 206e. In the present embodiment, however, the absence of a tooth in the inter-tooth portion 206d causes subtle deviation of the positional relation thereof. As a result, as shown in FIG. 32C, the tooth 125c tries to bear against the corner of the end portion of the second tooth 206e and run thereon. However, this state is unstable and the balance of the run-on state is destroyed and thus, as shown in FIG. 32D, the teeth 125a and 125c slip down from the first tooth 206c and the second tooth 206e, respectively. The tooth 125b then bears against and meshes with the left side surface of the first tooth 206c as viewed in the figure, and further the tooth 125d subsequently meshes with the second tooth 206e, and shift is made to a normal meshing state.

In this manner, according to the present embodiment, even if during the shift to the meshing state from the untoothed portion 206a to the toothed portion of the timing belt 206 relative to the driving pulley 125, the tooth of the driving pulley 125 runs on the first tooth 206c at the end of the toothed portion of the timing belt 206, the balance of the run-on state is destroyed and shift is quickly made to a normal meshing state during the rotation of the driving pulley 125 over several teeth thereof. Before the recording head 108 is transferred to the recording area, the running state of the timing belt 206 is made stable, whereby recording of high quality can be accomplished.

At first, the tooth of the driving pulley 125 does not always run right on the first tooth 206c of the timing belt 206, but when it runs on the end portion of the first tooth 206c, it is in a more unstable run-on state, and shift is more quickly made to a normal meshing state. Of course, if run-on does not occur at first, a shift will be intactly made to a normal meshing state.

In the foregoing, the distance of only one of the teeth of the toothed portion of the timing belt which are located in face-to-face relationship with the opposite ends of the untoothed portion thereof from its neighboring tooth has been specially set, but it is also conceivable to set the distances of both of the teeth located in face-to-face relationship with the opposite ends of the untoothed portion from their neighboring teeth. Of course, the structure of the timing belt as described above can be applied not only to the carriage moving mechanism of a recording apparatus, but also is equally applicable to a timing belt driving mechanism used as a driving mechanism in various instruments.

As described above, according to the present invention, there can be provided a recording apparatus which can accomplish good recording.

In the present invention, as the recording means, use can be made of not only the ink jet recording system using an ink jet head, but also, for example, the thermosensitive recording system or the heat transfer recording system using a thermal head, and the impact recording system using a daisy wheel, a wire rod or the like. Also, among the ink jet recording systems, the present invention can of course be applied to the bubble jet recording system or the like in which at least one driving signal for providing a rapid temperature rise exceeding nuclear boiling is applied to an electro-thermal converting member to thereby generate heat energy in the electro-thermal converting member and cause film-boiling on the heat acting surface of a recording head, thereby forming a bubble in ink and by the growth and contraction of this bubble, ink is discharged through a discharge port formed in the ink jet head.

We claim:

1. A recording apparatus for effecting recording on a recording medium, said recording apparatus comprising:
    recording means for effecting recording on the recording medium;
    a reversible motor for generating a drive force;
    force transmitting means having a plurality of gear teeth for transmitting the drive force of said motor;
    a belt having a engagement portion including a plurality of belt teeth engageable with said force transmitting means to receive the transmission of the drive force in order to move said recording means, and an untoothed portion in which said engagement portion is not provided and to which the drive force is not transmitted from said force transmitting means due to slipping of said belt with respect to said force transmitting means; and
    control means for controlling said motor so that said motor is rotated in a reverse direction and thereafter rotated in a forward direction when said engagement portion of said belt is brought into engagement with said force transmitting means, whereby a contact balance between a crest of one of said gear teeth and a crest of one of said belt teeth is upset during reverse and forward rotation of said motor due to relative sliding of said gear and belt teeth so that the crest of both said gear and belt teeth mesh with valleys of said belt and gear teeth, respectively.

2. A recording apparatus according to claim 1, wherein said recording means is provided on a carriage reciprocally movable transverse to the conveyance path of the recording medium.

3. A recording apparatus according to claim 1, wherein said motor is a stepping motor.

4. A recording apparatus according to claim 1, wherein the operation of said motor, which includes said motor first rotating by a predetermined amount in the reverse direction after said belt is returned by the reverse rotation of said force transmitting means so that said gear teeth and said belt teeth again mesh with each other, and said motor then rotating by a predetermined amount in the forward direction, is repeated at least one time.

5. A recording apparatus according to claim 1, wherein said recording means includes an electrothermal converting element for generating thermal energy to discharge ink.

6. A recording apparatus comprising a recording means for recording, a timing belt provided with an untoothed portion, a belt-driving pulley and a follower pulley provided with a meshing tooth in a portion of contact thereof with said timing belt, characterized in that said belt-driving pulley is rotated in forward and reverse directions by a drive source to thereby reciprocally move a carriage carrying said recording means and connected to said timing belt and the transmission of the drive force is cut off when the untoothed portion of said timing belt comes into contact with said belt-driving pulley, and where a meshing length between said belt-driving pulley and said timing belt is X, a length of the untoothed portion of said timing belt Y and a length of a meshing portion between said timing belt and said follower pulley Z, the following relation is obtained: $Z>Y>X$.

7. A recording apparatus comprising:
    an ink jet recording head, said recording head including an electrothermal converting element for generating thermal energy to discharge ink; and
    a timing belt driving mechanism for moving said recording head, said mechanism including a timing belt having a toothed portion formed with teeth of a predetermined shape a toothed portion formed with teeth of a predetermined shape at a predetermined pitch and an untoothed portion, said belt being moved by the rotative driving of a driving pulley having teeth meshing with said belt to thereby move a driven member coupled to said belt, said mechanism characterized in that said untoothed portion of said timing belt allows idle rotation of said driving pulley relative to said belt, and the shape of at least one of the teeth of said toothed portion of said belt which are located at opposite ends of said untoothed portion differs from the shape of other teeth of said toothed portion and is formed into such a shape that it is difficult for said teeth of said driving pulley to run thereon.

8. A recording apparatus according to claim 7, wherein ink is discharged from a discharge port of said recording head by formation of an air bubble generated by heat from said electrothermal converting element exceeding film boiling.

9. A recording apparatus comprising:
    an ink jet recording head, said recording head including an electrothermal converting element for generating thermal energy to discharge ink; and
    a timing belt driving mechanism for moving said recording head, said mechanism including a timing belt formed with teeth at a predetermined pitch, said belt being moved by the rotative driving of a driving pulley when said belt is meshed with said pulley to thereby move a driven member coupled to said belt, said mechanism characterized in that said timing belt is provided with an untoothed portion for allowing idle rotation of said driving pulley relative to said belt, and a distance between corresponding portions of at least one of the teeth of the toothed portion of said belt which are located at opposite ends of said untoothed portion and a tooth neighboring said at least one of the teeth is set to substantially twice said predetermined pitch.

10. A recording apparatus according to claim 9, wherein ink is discharged from a discharge port of said recording head by formation of an air bubble generated by heat from said electrothermal converting element exceeding film boiling.

* * * * *

UNITED STATES PATENT AND TRADEMARK OFFICE
CERTIFICATE OF CORRECTION

PATENT NO.   : 5,140,344
DATED        : August 18, 1992
INVENTOR(S)  : ISAO TSUKADA, ET AL.

Figure 1C:
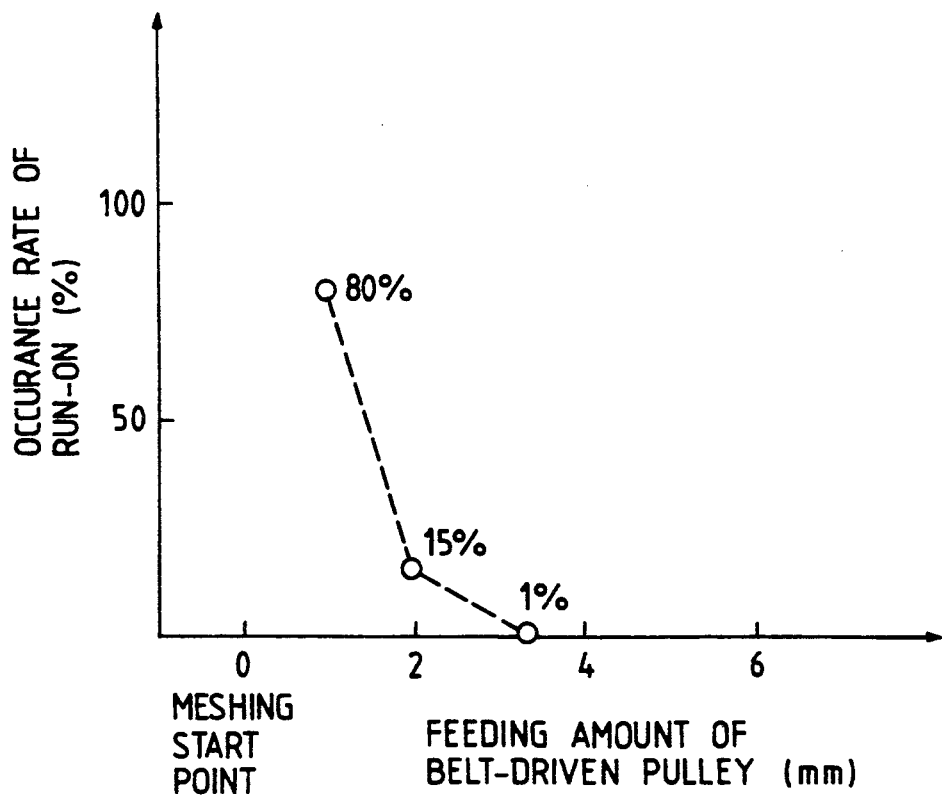
FIG. 1C is a graph showing the relation of the occurrence rate of run-on of the toothed portion of the belt onto the crest of a tooth to the feeding amount of the belt-driving pulley.

It is certified that error appears in the above-identified patent and that said Letters Patent is hereby corrected as shown below:

SHEET 1 OF 20:
    Figure 1C, "OCCURANCE" should read --OCCURRENCE--.

COLUMN 1:
    Line 19, "syste," should read --system,--;
    Line 49, "tooth 106C" should read --leading tooth 106C--.

COLUMN 7:
    Line 25, "the" (first occurrence) should be deleted;
    Line 67, "unit" should read --unit,--.

COLUMN 13:
    Line 34, "of," should read --of--.

UNITED STATES PATENT AND TRADEMARK OFFICE
CERTIFICATE OF CORRECTION

PATENT NO. : 5,140,344

DATED : August 18, 1992

INVENTOR(S) : ISAO TSUKADA, ET AL.

Page 2 of 2

It is certified that error appears in the above-identified patent and that said Letters Patent is hereby corrected as shown below:

COLUMN 16:

Line 22, "from" should read --to--.

COLUMN 20:

Line 21, "a toothed portion formed" should be deleted;

Line 22, "with teeth of a predetermined shape" should be deleted.

Signed and Sealed this

Ninth Day of November, 1993

*Attest:*

BRUCE LEHMAN

*Attesting Officer*    *Commissioner of Patents and Trademarks*